(12) United States Patent
Liu et al.

(10) Patent No.: US 12,507,255 B2
(45) Date of Patent: Dec. 23, 2025

(54) METHOD AND DEVICE IN NODES USED FOR WIRELESS COMMUNICATION

(71) Applicant: APOGEE NETWORKS, LLC, Dallas, TX (US)

(72) Inventors: Zheng Liu, Shanghai (CN); Xiaobo Zhang, Shanghai (CN)

(73) Assignee: APOGEE NETWORKS, LLC, Plano, TX (US)

( * ) Notice: Subject to any disclaimer, the term of this patent is extended or adjusted under 35 U.S.C. 154(b) by 259 days.

(21) Appl. No.: 18/144,259

(22) Filed: May 8, 2023

(65) Prior Publication Data
US 2023/0276460 A1 Aug. 31, 2023

Related U.S. Application Data

(63) Continuation of application No. PCT/CN2021/129932, filed on Nov. 11, 2021.

(30) Foreign Application Priority Data

Nov. 11, 2020 (CN) .......................... 202011256557.3

(51) Int. Cl.
*H04W 72/232* (2023.01)
*H04W 72/0446* (2023.01)
*H04W 72/0453* (2023.01)

(52) U.S. Cl.
CPC ..... *H04W 72/232* (2023.01); *H04W 72/0446* (2013.01); *H04W 72/0453* (2013.01)

(58) Field of Classification Search
CPC .. H04B 7/024; H04L 5/0053; H04W 72/0446; H04W 72/0453; H04W 72/232

(Continued)

(56) References Cited

U.S. PATENT DOCUMENTS

2022/0330064 A1* 10/2022 Liu .................. H04W 72/23
2023/0388968 A1* 11/2023 Yang ................ H04W 68/025

FOREIGN PATENT DOCUMENTS

| CN | 110266450 A | 9/2019 |
|---|---|---|
| CN | 110474731 A | 11/2019 |
| WO | 2019099443 A1 | 5/2019 |

OTHER PUBLICATIONS

ISR received in application No. PCT/CN2021/129932 dated Feb. 14, 2022.

(Continued)

*Primary Examiner* — Robert J Lopata
(74) *Attorney, Agent, or Firm* — VOLPE KOENIG

(57) ABSTRACT

The present application discloses a method and a device in a node for wireless communications. A node receives a first information block, the first information block being used to determine X1 PDCCH occasions; the node receives a first signaling and a first signal, the first signaling being used to determine a frequency-domain resource set occupied by the first signal in frequency domain; the node transmits a second signal, the second signal carrying a first bit block; the first signaling is used to determine a first time interval length, the first time interval length being used to determine a length of a time interval in time domain between a first PDCCH occasion and the first signal; a position of the first signal in time domain is used to determine a position of the second signal in time domain. The present application ensures the HARQ transmission.

20 Claims, 5 Drawing Sheets

(58) Field of Classification Search
USPC .......................................................... 370/329
See application file for complete search history.

(56) References Cited

OTHER PUBLICATIONS

First Office Action of Chinese patent application No. CN202011256557.3 dated Jan. 18, 2024.
First Search Report of Chinese patent application No. CN202011256557.3 dated Jan. 16, 2024.
Sharp "Downlink structure and procedure for NR-U operation" 3GPP TSG RAN WG1 Meeting #97 R1-1907210 May 17, 2019.
Third Generation Partnership Project, "Technical Specification Group Radio Access Network; NR; Physical channels and modulation (Release 16)," 3GPP TS 38.211 V16.3.0 (Sep. 2020).
Third Generation Partnership Project, "Technical Specification Group Radio Access Network; NR; Physical layer procedures for control (Release 16)," 3GPP TS 38.213 V16.3.0 (Sep. 2020).
Third Generation Partnership Project, "Technical Specification Group Radio Access Network; NR; Physical layer procedures for data (Release 16)," 3GPP TS 38.214 V16.3.0 (Sep. 2020).

* cited by examiner

METHOD AND DEVICE IN NODES USED FOR WIRELESS COMMUNICATION

CROSS REFERENCE TO RELATED APPLICATIONS

This application is the continuation of the international patent application No. PCT/CN2021/129932, filed on Nov. 11, 2021, and claims the priority benefit of Chinese Patent Application No. 202011256557.3, filed on Nov. 11, 2020, the full disclosure of which is incorporated herein by reference.

BACKGROUND

Technical Field

The present application relates to transmission methods and devices in wireless communication systems, and in particular to a multi-antenna transmission scheme and device in wireless communications.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 session to standardize the NR.

The multi-antenna (e.g., Multiple Input Multiple Output, abbreviated as MIMO, multi-Transmission Reception Point (multi-TRP), and multi-pannel) techniques make up an integral part in the New Radio (NR) techniques. To adapt to more diversified application scenarios and meet higher requirements, a Work Item (WI) on further enhancement of MIMO under NR was approved at the 3GPP RAN #86 to provide support for multi-antenna communications which is more robust, with higher spectral efficiency and more application scenarios.

SUMMARY

In a multi-antenna system, like the Multi-Transmission Reception Point (Multi-TRP) communications, the robustness of transmission can be enhanced in a way that a same channel or signal is transmitted through multiple transmission reception points. The Multi-TRP transmission of a data channel is supported in Rel-16, and the 3GPP planned to introduce the Multi-TRP transmission of a control channel in Rel-17.

To address the issue of transmission of control channels in a multi-antenna system, the present application provides a solution. It should be noted that the statement in the present application only takes the multi-antenna system, especially a multi-TRP transmission system, as a typical application scenario or example; this application is also applicable to other scenarios confronting similar problems, such as scenarios having higher demands on the robustness or coverage of control channels, or in need of PDCCH-linked scenario apart from multi-TRP transmissions, which include but are not limited to coverage enhancement system, the Internet of Things (IoT), Ultra Reliable Low Latency Communications (URLLC) network and Vehicle-to-Everything (V2X), where similar technical effects can be achieved. Additionally, the adoption of a unified solution for various scenarios, including but not limited to multi-antenna systems, contributes to the reduction of hardcore complexity and costs. In the case of no conflict, the embodiments of a first node and the characteristics in the embodiments may be applied to a second node, and vice versa. Particularly, for interpretations of the terminology, nouns, functions and variables (unless otherwise specified) in the present application, refer to definitions given in TS36 series, TS38 series and TS37 series of 3GPP specifications.

The present application provides a method in a first node for wireless communications, comprising:
- receiving a first information block, the first information block being used to determine X1 PDCCH occasions, where X1 is a positive integer greater than 1;
- receiving a first signaling and receiving a first signal, the first signal occupying a first frequency-domain resource set in frequency domain, and the first signaling being used to determine the first frequency-domain resource set; and
- transmitting a second signal, the second signal carrying a first bit block, the first bit block comprising at least one bit;
- herein, the first signaling is used to determine a first time interval length, the first time interval length being used to determine a length of a time interval in time domain between a first PDCCH occasion and the first signal, the first PDCCH occasion being one of the X1 PDCCH occasions; the first bit block comprises a first bit sub-block, the first bit sub-block comprising at least one bit; a position of the first signal in time domain is used to determine a position of the second signal in time domain, whether the first signal is correctly received being used to determine a bit value of the first bit sub-block; a second PDCCH occasion is used to determine the first bit sub-block in the first bit block, where the second PDCCH occasion is one of the X1 PDCCH occasions.

In one embodiment, by determining a time-domain position of a first signal through a first PDCCH occasion and determining a first bit sub-block through a second PDCCH occasion, the network is thus able to flexibly configure a reference PDCCH occasion for PDSCH scheduling and a reference PDCCH for determining a HARQ-ACK codebook, thus ensuring a correct PDSCH transmission, and optimizing the overall performance.

In one embodiment, with the introduction of a first PDCCH occasion and a second PDCCH occasion, when two or multiple PDCCHs are supported in scheduling a same PDSCH, the consistency of understanding of scheduled PDSCH resources and HARQ-ACK codebook between the base station and the UE can be guaranteed, thus ensuring correct transmissions of the PDSCH and HARQ-ACK.

According to one aspect of the present application, the above method is characterized in that the first signaling is used to determine a target symbol spacing, the target symbol spacing being used to determine a starting symbol occupied by the first signal in time domain, and a number of symbols comprised in the target symbol spacing being used to determine the first time interval length; whether the first PDCCH occasion and the first signal belong to a same slot is used to determine whether a starting symbol comprised in the first PDCCH occasion is used to determine the first bit sub-block in the first bit block, where the number of symbols comprised in the target symbol spacing is used to determine the first bit sub-block in the first bit block.

In one embodiment, by determining whether a starting symbol comprised by a first PDCCH occasion is used to determine a first bit sub-block according to whether the first PDCCH occasion and a first signal belong to a same slot, when a Type-1 HARQ-ACK codebook is used and taking the starting point of PDCCH as a reference for SLIV is supported, besides, a second PDCCH occasion is identical to the first PDCCH occasion, the first PDCCH occasion will be taken into account for the determination of the HARQ-ACK codebook, which avoids collisions between HARQ-ACKs and ensures the correct HARQ-ACK transmission.

According to one aspect of the present application, the above method is characterized in comprising:
receiving a second signaling;
herein, a PDCCH candidate occupied by the second signaling is different from a PDCCH candidate occupied by the first signaling; the second signaling carries a target indication, the second signaling belonging to the second PDCCH occasion in time domain; the second PDCCH occasion belongs to X2 PDCCH occasions, X2 being a positive integer greater than 1; the X2 PDCCH occasions are indexed in order, and the target indication is used together with an index of the second PDCCH occasion among the X2 PDCCH occasions for determining the first bit sub-block in the first bit block.

According to one aspect of the present application, the above method is characterized in that a position of the first PDCCH occasion among the X1 PDCCH occasions is pre-defined, or a position of the first PDCCH occasion among the X1 PDCCH occasions is configurable; a position of the second PDCCH occasion among the X1 PDCCH occasions is pre-defined, or a position of the second PDCCH occasion among the X1 PDCCH occasions is configurable.

In one embodiment, a position of a first PDCCH occasion among X1 PDCCH occasions is pre-defined or configurable, and a position of the second PDCCH occasion among the X1 PDCCH occasions is pre-defined or configurable, which ensures the consistent understanding of the PDSCH resources as well as the structure of HARQ-ACK codebook between the network and the UE, and, while guaranteeing the PDSCH and HARQ-ACK transmissions, optimizes the designing on demand, thus increasing the scheduling flexibility.

According to one aspect of the present application, the above method is characterized in that a PDCCH candidate occupied by the first signaling is a first PDCCH candidate, and a second PDCCH candidate is a PDCCH candidate other than the first PDCCH candidate; a quasi co-location of a reference signal comprised in the first PDCCH candidate is different from a quasi co-location of a reference signal comprised in the second PDCCH candidate; the first PDCCH candidate and the second PDCCH candidate are linked.

According to one aspect of the present application, the above method is characterized in that the first signal occupies a first time-domain resource block in time domain, while a signaling carried by a PDCCH candidate other than a PDCCH candidate occupied by the first signaling is used to indicate a second time-domain resource block, there existing overlapping time-domain resources between the first time-domain resource block and the second time-domain resource block.

According to one aspect of the present application, the above method is characterized in comprising:
transmitting a second information block;
herein, the second information block is used to indicate at least one of whether the first node supports PDCCH candidates being mutually linked or a linkage type between mutually linked PDCCH candidates supported by the first node.

The present application provides a method in a second node for wireless communications, comprising:
transmitting a first information block, the first information block being used to indicate X1 PDCCH occasions, where X1 is a positive integer greater than 1;
transmitting a first signaling and transmitting a first signal, the first signal occupying a first frequency-domain resource set in frequency domain, and the first signaling being used to indicate the first frequency-domain resource set; and
receiving a second signal, the second signal carrying a first bit block, the first bit block comprising at least one bit;
herein, the first signaling is used to indicate a first time interval length, the first time interval length being used to determine a length of a time interval in time domain between a first PDCCH occasion and the first signal, the first PDCCH occasion being one of the X1 PDCCH occasions; the first bit block comprises a first bit sub-block, the first bit sub-block comprising at least one bit; a position of the first signal in time domain is used to determine a position of the second signal in time domain, whether the first signal is correctly received being used to determine a bit value of the first bit sub-block; a second PDCCH occasion is used to determine the first bit sub-block in the first bit block, where the second PDCCH occasion is one of the X1 PDCCH occasions.

According to one aspect of the present application, the above method is characterized in that the first signaling is used to indicate a target symbol spacing, the target symbol spacing being used to determine a starting symbol occupied by the first signal in time domain, and a number of symbols comprised in the target symbol spacing being used to determine the first time interval length; whether the first PDCCH occasion and the first signal belong to a same slot is used to determine whether a starting symbol comprised in the first PDCCH occasion is used to determine the first bit sub-block in the first bit block, where the number of symbols comprised in the target symbol spacing is used to determine the first bit sub-block in the first bit block.

According to one aspect of the present application, the above method is characterized in comprising:
transmitting a second signaling;
herein, a PDCCH candidate occupied by the second signaling is different from a PDCCH candidate occupied by the first signaling; the second signaling carries a target indication, the second signaling belonging to the second PDCCH occasion in time domain; the second PDCCH occasion belongs to X2 PDCCH occasions, X2 being a positive integer greater than 1; the X2 PDCCH occasions are indexed in order, and the target indication is used together with an index of the second PDCCH occasion among the X2 PDCCH occasions for determining the first bit sub-block in the first bit block.

According to one aspect of the present application, the above method is characterized in that a position of the first PDCCH occasion among the X1 PDCCH occasions is pre-defined, or a position of the first PDCCH occasion among the X1 PDCCH occasions is configurable; a position of the second PDCCH occasion among the X1 PDCCH occasions is pre-defined, or a position of the second PDCCH occasion among the X1 PDCCH occasions is configurable.

According to one aspect of the present application, the above method is characterized in that a PDCCH candidate occupied by the first signaling is a first PDCCH candidate, and a second PDCCH candidate is a PDCCH candidate other than the first PDCCH candidate; a quasi co-location of a reference signal comprised in the first PDCCH candidate is different from a quasi co-location of a reference signal comprised in the second PDCCH candidate; the first PDCCH candidate and the second PDCCH candidate are linked.

According to one aspect of the present application, the above method is characterized in that the first signal occupies a first time-domain resource block in time domain, while a signaling carried by a PDCCH candidate other than a PDCCH candidate occupied by the first signaling is used to indicate a second time-domain resource block, there existing overlapping time-domain resources between the first time-domain resource block and the second time-domain resource block.

According to one aspect of the present application, the above method is characterized in comprising:
receiving a second information block;
herein, the second information block is used to indicate at least one of whether the first node supports PDCCH candidates being mutually linked or a linkage type between mutually linked PDCCH candidates supported by the first node.

The present application provides a first node for wireless communications, comprising:
a first receiver, receiving a first information block, the first information block being used to determine X1 PDCCH occasions, where X1 is a positive integer greater than 1;
the first receiver, receiving a first signaling and receiving a first signal, the first signal occupying a first frequency-domain resource set in frequency domain, and the first signaling being used to determine the first frequency-domain resource set; and
a first transmitter, transmitting a second signal, the second signal carrying a first bit block, the first bit block comprising at least one bit;
herein, the first signaling is used to determine a first time interval length, the first time interval length being used to determine a length of a time interval in time domain between a first PDCCH occasion and the first signal, the first PDCCH occasion being one of the X1 PDCCH occasions; the first bit block comprises a first bit sub-block, the first bit sub-block comprising at least one bit; a position of the first signal in time domain is used to determine a position of the second signal in time domain, whether the first signal is correctly received being used to determine a bit value of the first bit sub-block; a second PDCCH occasion is used to determine the first bit sub-block in the first bit block, where the second PDCCH occasion is one of the X1 PDCCH occasions.

The present application provides a second node for wireless communications, comprising:
a second transmitter, transmitting a first information block, the first information block being used to indicate X1 PDCCH occasions, where X1 is a positive integer greater than 1;
the second transmitter, transmitting a first signaling and transmitting a first signal, the first signal occupying a first frequency-domain resource set in frequency domain, and the first signaling being used to indicate the first frequency-domain resource set; and
a second receiver, receiving a second signal, the second signal carrying a first bit block, the first bit block comprising at least one bit;
herein, the first signaling is used to indicate a first time interval length, the first time interval length being used to determine a length of a time interval in time domain between a first PDCCH occasion and the first signal, the first PDCCH occasion being one of the X1 PDCCH occasions; the first bit block comprises a first bit sub-block, the first bit sub-block comprising at least one bit; a position of the first signal in time domain is used to determine a position of the second signal in time domain, whether the first signal is correctly received being used to determine a bit value of the first bit sub-block; a second PDCCH occasion is used to determine the first bit sub-block in the first bit block, where the second PDCCH occasion is one of the X1 PDCCH occasions.

In one embodiment, the method in the present application has the following advantages:
using the method provided in the present application, when two or multiple PDCCHs are supported in scheduling a same PDSCH, the consistency of understanding of scheduled PDSCH resources and HARQ-ACK codebook between the base station and the UE can be guaranteed, thus ensuring correct transmissions of the PDSCH and HARQ-ACK.
using the method provided in the present application enables the network to configure a reference PDCCH occasion scheduling a PDSCH and a reference PDCCH determining a HARQ-ACK codebook in a flexible manner, thus ensuring the correct transmission of the PDSCH and optimizing the overall performance.
using the method provided in the present application, when a Type-1 HARQ-ACK codebook is adopted and using the starting point of a PDCCH as reference for SLIV is supported, one can avoid HARQ-ACK collisions and ensure the correct transmission of HARQ-ACKs.
using the method provided in the present application, a consistent understanding of PDSCH resources and the structure of HARQ-ACK codebook between the network and the UE can be guaranteed, while ensuring both PDSCH and HARQ-ACK transmissions, the designing can be optimized according to requests to allow for more flexibility of scheduling.

BRIEF DESCRIPTION OF THE DRAWINGS

Other features, objects and advantages of the present application will become more apparent from the detailed description of non-restrictive embodiments taken in conjunction with the following drawings.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
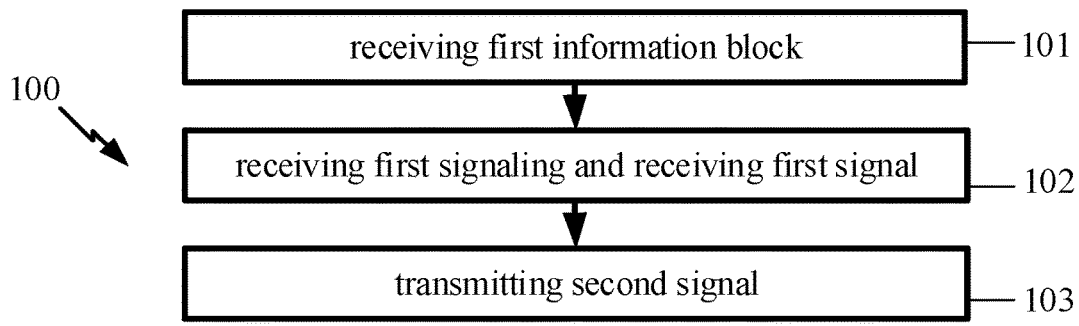
FIG. 1 illustrates a flowchart of a first information block, a first signaling, a first signal and a second signal according to one embodiment of the present application.

Embodiment 1 illustrates a flowchart of a first information block, a first signaling, a first signal and a second signal according to one embodiment of the present application, as shown in FIG. 1. In FIG. 1, each step represents a step, it should be particularly noted that the sequence order of each box herein does not imply a chronological order of steps marked respectively by these boxes.

In Embodiment 1, the first node in the present application receives a first information block in step 101, the first information block being used to determine X1 PDCCH occasions, where X1 is a positive integer greater than 1; the first node in the present application receives a first signaling and receives a first signal in step 102, the first signal occupying a first frequency-domain resource set in frequency domain, and the first signaling being used to determine the first frequency-domain resource set; and the first node in the present application transmits a second signal in step 103, the second signal carrying a first bit block, the first bit block comprising at least one bit; herein, the first signaling is used to determine a first time interval length, the first time interval length being used to determine a length of a time interval in time domain between a first PDCCH occasion and the first signal, the first PDCCH occasion being one of the X1 PDCCH occasions; the first bit block comprises a first bit sub-block, the first bit sub-block comprising at least one bit; a position of the first signal in time domain is used to determine a position of the second signal in time domain, whether the first signal is correctly received being used to determine a bit value of the first bit sub-block; a second PDCCH occasion is used to determine the first bit sub-block in the first bit block, where the second PDCCH occasion is one of the X1 PDCCH occasions.

In one embodiment, the first information block is transmitted via an air interface.

In one embodiment, the first information block is transmitted via a radio interface.

In one embodiment, a transmitter transmitting the first information block includes the second node in the present application.

In one embodiment, the first information block comprises all or part of a higher layer signaling.

In one embodiment, the first information block comprises all or part of a physical layer signaling.

In one embodiment, the first information block comprises all or part of a Radio Resource Control (RRC) signaling.

In one embodiment, the first information block comprises all or part of a Medium Access Control (MAC) layer signaling.

In one embodiment, the first information block comprises all or part of a System Information Block (SIB).

In one embodiment, the first information block is transmitted through a Downlink Shared Channel (DL-SCH).

In one embodiment, the first information block is transmitted through a Physical Downlink Shared Channel (PDSCH).

In one embodiment, the first information block is Cell Specific.

In one embodiment, the first information block is UE-specific.

In one embodiment, the first information block is configured Per Serving Cell.

In one embodiment, the first information block comprises all or partial fields in a Downlink Control Information (DCI) signaling.

In one embodiment, the first information block comprises more than one sub-information-block, and each sub-information-block comprised in the first information block is an Information Element (IE) or a field in an RRC signaling to which the first information block belongs; one or more sub-information-blocks comprised in the first information block is/are used to indicate the X1 PDCCH occasions.

In one embodiment, the first information block comprises all or partial fields in an Information Element (IE) "BWP-Downlink" in an RRC signaling.

In one embodiment, the first information block comprises all or partial fields in an Information Element (IE) "BWP-DownlinkDedicated" in an RRC signaling.

In one embodiment, the first information block comprises all or partial fields in an Information Element (IE) "PDCCH-Config" in an RRC signaling.

In one embodiment, the first information block comprises all or partial fields in an Information Element (IE) "ControlResourceSet" in an IE "PDCCH-Config" in an RRC signaling.

In one embodiment, the first information block comprises all or partial fields in an Information Element (IE) "SearchSpace" in an RRC signaling.

In one embodiment, the statement in the claims that "the first information block is used to determine X1 PDCCH occasions" includes the following meaning: the first information block is used by the first node in the present application for determining the X1 PDCCH occasions.

In one embodiment, the statement in the claims that "the first information block is used to determine X1 PDCCH occasions" includes the following meaning: the first information block explicitly indicates the X1 PDCCH occasions.

In one embodiment, the statement in the claims that "the first information block is used to determine X1 PDCCH occasions" includes the following meaning: the first information block implicitly indicates the X1 PDCCH occasions.

In one embodiment, the statement in the claims that "the first information block is used to determine X1 PDCCH occasions" includes the following meaning: the first information block is used to indicate that the X1 PDCCH occasions are mutually linked.

In one embodiment, the statement in the claims that "the first information block is used to determine X1 PDCCH occasions" includes the following meaning: the first information block is used to indicate that two PDCCH candidates that respectively belong to two PDCCH occasions among the X1 PDCCH occasions in time domain are mutually linked.

In one embodiment, the statement in the claims that "the first information block is used to determine X1 PDCCH occasions" includes the following meaning: the first information block is used to indicate that two PDCCH candidates that respectively belong to two PDCCH occasions among the X1 PDCCH occasions in time domain carry identical Downlink Control Information (DCI) Payload.

In one embodiment, the statement in the claims that "the first information block is used to determine X1 PDCCH occasions" includes the following meaning: the first information block is used to indicate that two PDCCH candidates that respectively belong to two PDCCH occasions among the X1 PDCCH occasions in time domain can be Soft Combining.

In one embodiment, the statement in the claims that "the first information block is used to determine X1 PDCCH occasions" includes the following meaning: the first information block is used to indicate that two PDCCH candidates that respectively belong to two PDCCH occasions among the X1 PDCCH occasions in time domain respectively carry two repetitions of the same DCI Payload.

In one embodiment, the statement in the claims that "the first information block is used to determine X1 PDCCH occasions" includes the following meaning: the first information block is used to indicate that DCIs respectively carried by two PDCCH candidates that respectively belong to two PDCCH occasions among the X1 PDCCH occasions in time domain are used for scheduling a same Shared Channel.

In one embodiment, the statement in the claims that "the first information block is used to determine X1 PDCCH occasions" includes the following meaning: the first information block is used to indicate that DCIs respectively carried by two PDCCH candidates that respectively belong to two PDCCH occasions among the X1 PDCCH occasions in time domain are used for scheduling a same Physical Downlink Shared Channel (PDSCH).

In one embodiment, the statement in the claims that "the first information block is used to determine X1 PDCCH occasions" includes the following meaning: the first information block is used to indicate that DCIs respectively carried by two PDCCH candidates that respectively belong to two PDCCH occasions among the X1 PDCCH occasions in time domain are used for triggering a same Reference Signal (RS).

In one embodiment, the statement in the claims that "the first information block is used to determine X1 PDCCH occasions" includes the following meaning: the first information block is used to indicate that DCIs respectively carried by two PDCCH candidates that respectively belong to two PDCCH occasions among the X1 PDCCH occasions in time domain are used for scheduling a same Transport Block (TB).

In one embodiment, the statement in the claims that "the first information block is used to determine X1 PDCCH occasions" includes the following meaning: the first information block is used to indicate that DCIs respectively carried by two PDCCH candidates that respectively belong to two PDCCH occasions among the X1 PDCCH occasions in time domain are two transmissions among Multi-Chance transmissions of scheduling information of a same Transport Block (TB).

In one embodiment, the statement in the claims that "the first information block is used to determine X1 PDCCH occasions" includes the following meaning: the first information block is used for indicating characteristics comprised in the claim 5 of the present application.

In one embodiment, X1 is equal to 2.

In one embodiment, X1 is equal to 3.

In one embodiment, X1 is equal to 4.

In one embodiment, X1 is greater than 4.

In one embodiment, any PDCCH occasion among the X1 PDCCH occasions is a PDCCH Transmission Occasion.

In one embodiment, any PDCCH occasion among the X1 PDCCH occasions is a PDCCH Monitoring Occasion (PDCCH MO).

In one embodiment, any PDCCH occasion among the X1 PDCCH occasions comprises a positive integer number of time-domain consecutive symbols.

In one embodiment, any PDCCH occasion among the X1 PDCCH occasions comprises a positive integer number of time-domain consecutive symbols being occupied by PDCCH Candidates.

In one embodiment, time-domain resources comprised in a PDCCH Candidate occupied by the first signaling belong to one of the X1 PDCCH occasions.

In one embodiment, the first signaling belongs to a PDCCH occasion among the X1 PDCCH occasions in time domain.

In one embodiment, time-domain resources comprised in a PDCCH Candidate occupied by the first signaling belong to a PDCCH occasion other than the X1 PDCCH occasions.

In one embodiment, the first signaling belongs to a PDCCH occasion other than the X1 PDCCH occasions in time domain.

In one embodiment, any two PDCCH occasions of the X1 PDCCH occasions are different.

In one embodiment, time-domain resources comprised in any two PDCCH occasions of the X1 PDCCH occasions are Non-overlapped.

In one embodiment, time-domain resources comprised in any two PDCCH occasions of the X1 PDCCH occasions are Orthogonal.

In one embodiment, the first signaling is transmitted via an air interface.

In one embodiment, the first signaling is transmitted via a radio interface.

In one embodiment, the first signaling is transmitted via a Uu interface.

In one embodiment, the first signaling is transmitted via a PC5 interface.

In one embodiment, a transmitter transmitting the first signaling includes the second node in the present application.

In one embodiment, the first signaling comprises physical-layer information.

In one embodiment, the first signaling comprises higher-layer information.

In one embodiment, the first signaling is received before the first information block.

In one embodiment, the first signaling is received after the first information block.

In one embodiment, the first signaling is transmitted through a Physical Downlink Control Channel (PDCCH).

In one embodiment, the first signaling carries all or partial fields in a Downlink Control Information (DCI) Format.

In one embodiment, the first signaling carries all or partial fields in one of DCI Formats 1-0, 1-1, or 1-2.

In one embodiment, the first signaling comprises all or part of a Radio Resource Control (RRC) signaling.

In one embodiment, the first signaling comprises all or part of a Medium Access Control (MAC) layer signaling.

In one embodiment, the first signaling is transmitted through a Downlink Shared Channel (DL-SCH).

In one embodiment, the first signaling is transmitted through a Physical Downlink Shared Channel (PDSCH).

In one embodiment, the first signaling comprises "sps-Config".

In one embodiment, the first signaling comprises "BWP-DownlinkDedicated".

In one embodiment, the statement in the claims of "the first signaling being used to determine the first frequency-domain resource set" includes the following meaning: the first signaling is used by the first node in the present application to determine the first frequency-domain resource set.

In one embodiment, the statement in the claims of "the first signaling being used to determine the first frequency-domain resource set" includes the following meaning: the first signaling is used by the first node in the present application for explicitly indicating the first frequency-domain resource set.

In one embodiment, the statement in the claims of "the first signaling being used to determine the first frequency-domain resource set" includes the following meaning: the first signaling is used by the first node in the present application for implicitly indicating the first frequency-domain resource set.

In one embodiment, the statement in the claims of "the first signaling being used to determine the first frequency-domain resource set" includes the following meaning: the first signaling indicates a first virtual frequency-domain resource set, the first virtual frequency-domain resource set comprising a positive integer number of Virtual Resource Block(s) (VRB(s)); the first frequency-domain resource set comprises a positive integer number of Physical Resource Block(s) (PRB(s)), where the VRB(s) comprised in the first virtual frequency-domain resource set is/are used to determine PRB(s) comprised in the first frequency-domain resource set.

In one embodiment, the statement in the claims of "the first signaling being used to determine the first frequency-domain resource set" includes the following meaning: the first signaling indicates a target frequency-domain resource set, the target frequency-domain resource set being a default version of the first frequency-domain resource set.

In one embodiment, the statement in the claims of "the first signaling being used to determine the first frequency-domain resource set" includes the following meaning: one or multiple fields comprised in the first signaling is(are) used for indicating the first frequency-domain resource set.

In one embodiment, the first frequency-domain resource set comprises a positive integer number of PRB(s).

In one embodiment, the first frequency-domain resource set comprises a positive integer number of subcarrier(s).

In one embodiment, the first frequency-domain resource set comprises a positive integer number of frequency-domain consecutive PRBs.

In one embodiment, the first frequency-domain resource set comprises a positive integer number of frequency-domain discrete PRBs.

In one embodiment, the first signal occupies each PRB comprised by the first frequency-domain resource set in frequency domain.

In one embodiment, a modulation symbol generating the first signal is mapped to PRB(s) comprised in the first frequency-domain resource set in frequency domain.

In one embodiment, PRB(s) comprised in the first frequency-domain resource set carries(carry) the first signal.

In one embodiment, the first signal is scheduled to be transmitted on PRB(s) comprised in the first frequency-domain resource set.

In one embodiment, the first signal is a radio signal.

In one embodiment, the first signal is a baseband signal.

In one embodiment, the first signal is a Radio Frequency (RF) signal.

In one embodiment, the first signal is transmitted via an air interface.

In one embodiment, the first signal is transmitted via a radio interface.

In one embodiment, the first signal is transmitted via a Uu interface.

In one embodiment, the first signal is transmitted via a PC5 interface.

In one embodiment, a transmitter transmitting the first signal includes the second node in the present application.

In one embodiment, the first signal is transmitted through a Downlink Shared Channel (DL-SCH).

In one embodiment, the first signal is transmitted through a Physical Downlink Shared Channel (PDSCH).

In one embodiment, the first signal is Group-cast/Multi-cast.

In one embodiment, the first signal is Unicast.

In one embodiment, the first signal is transmitted through a Physical Multicast Channel (PMCH).

In one embodiment, the first signal is used for transmitting a Multicast Control Channel (MCCH).

In one embodiment, the first signal is used for transmitting a Multicast Traffic Channel (MTCH).

In one embodiment, the first signal is used for transmitting a Single Cell Multicast Control Channel (SC-MCCH).

In one embodiment, the first signal is used for transmitting a Single Cell Multicast Traffic Channel (SC-MTCH).

In one embodiment, all or partial bits in a Transport Block (TB) are used for generating the first signal.

In one embodiment, the first signal is used for carrying all or partial bits in a Transport Block (TB).

In one embodiment, all or partial bits in a Code Block Group (CBG) are used for generating the first signal.

In one embodiment, the first signal is an Initial Transmission that belongs to a Hybrid Automatic Repeat Request (HARQ) Process.

In one embodiment, the first signal is a Re-transmission that belongs to a Hybrid Automatic Repeat Request (HARQ) Process.

In one embodiment, the first signal is transmitted through a Semi-Persistent Scheduling (SPS) PDSCH.

In one embodiment, the first signal comprises a Reference Signal.

In one embodiment, the first signal comprises a Shared Channel (SCH) and a Reference Signal.

In one embodiment, the first signal is received after the first signaling.

In one embodiment, the second signal is a radio signal.

In one embodiment, the second signal is a baseband signal.

In one embodiment, the second signal is a Radio Frequency (RF) signal.

In one embodiment, the second signal is transmitted via an air interface.

In one embodiment, the second signal is transmitted via a radio interface.

In one embodiment, the second signal is transmitted via a Uu interface.

In one embodiment, the second signal is transmitted via a PC5 interface.

In one embodiment, a receiver receiving the second signal includes the second node in the present application.

In one embodiment, the second signal is transmitted after the first signal.

In one embodiment, the second signal is transmitted through an Uplink Shared Channel (UL-SCH).

In one embodiment, the second signal is transmitted through a Physical Uplink Control Channel (PUCCH).

In one embodiment, the second signal is transmitted through a Physical Uplink Shared Channel (PUSCH).

In one embodiment, the second signal is piggybacked through a Physical Uplink Shared Channel (PUSCH).

In one embodiment, the second signal is transmitted through a Configured Grant (CG) PUSCH.

In one embodiment, the second signal comprises a Reference Signal.

In one embodiment, the second signal comprises a Shared Channel (SCH) and a Reference Signal.

In one embodiment, the first bit block comprises one or more fields in Uplink Control Information (UCI).

In one embodiment, each bit comprised in the first bit block belongs to an Uplink Control Information (UCI) Payload.

In one embodiment, the first bit block comprises a Hybrid Automatic Repeat Request-Acknowledgement (HARQ-ACK) bit.

In one embodiment, the first bit block is a Hybrid Automatic Repeat Request-Acknowledgement (HARQ-ACK) Codebook.

In one embodiment, each bit in the first bit block is a HARQ-ACK bit.

In one embodiment, the first bit block is a Type-1 HARQ-ACK Codebook.

In one embodiment, the first bit block is a Type-2 HARQ-ACK Codebook.

In one embodiment, the first bit block is a Type-3 HARQ-ACK Codebook.

In one embodiment, the number of bit(s) comprised in the first bit block is equal to 1.

In one embodiment, the number of bits comprised in the first bit block is greater than 1.

In one embodiment, bits in the first bit block are sequentially arranged.

In one embodiment, a UCI Payload to which the first bit block belongs is used for generating the second signal.

In one embodiment, the first bit block is used for generating the second signal.

In one embodiment, the first bit block is used to determine a sequence generating the second signal.

In one embodiment, a UCI Payload to which the first bit block belongs is used to determine a sequence generating the second signal.

In one embodiment, the second signal piggybacks the first bit block.

In one embodiment, the second signal piggybacks a UCI Payload to which the first bit block belongs.

In one embodiment, the second signal is punctured by a Modulation Symbol carrying the first bit block.

In one embodiment, the second signal is punctured by a Modulation Symbol carrying UCI to which the first bit block belongs.

In one embodiment, the second signal performs Rate Matching for a Modulation Symbol carrying the first bit block.

In one embodiment, the second signal performs Rate Matching for a Modulation Symbol carrying UCI to which the first bit block belongs.

In one embodiment, the statement in the claims that "the first signaling is used to determine a first time interval length" includes the following meaning: the first signaling is used by the first node in the present application to determine the first time interval length.

In one embodiment, the statement in the claims that "the first signaling is used to determine a first time interval length" includes the following meaning: the first signaling is used for explicitly indicating the first time interval length.

In one embodiment, the statement in the claims that "the first signaling is used to determine a first time interval length" includes the following meaning: the first signaling is used for implicitly indicating the first time interval length.

In one embodiment, the statement in the claims that "the first signaling is used to determine a first time interval length" includes the following meaning: one or multiple fields comprised in the first signaling is(are) used for indicating the first time interval length.

In one embodiment, two different fields comprised in the first signaling are used for respectively determining the first frequency-domain resource set and the first time interval length.

In one embodiment, a same field comprised in the first signaling is used for determining the first frequency-domain resource set and the first time interval length.

In one embodiment, the statement in the claims that "the first signaling is used to determine a first time interval length" is implemented by means of the claim 2 in the present application.

In one embodiment, the statement in the claims that "the first signaling is used to determine a first time interval length" includes the following meaning: a Start and Length Indicator Value (SLIV) indicated by the first signaling is used to determine the first time interval length.

In one embodiment, the statement in the claims that "the first signaling is used to determine a first time interval length" includes the following meaning: the first signaling is used to determine a first symbol interval, the first symbol interval comprising a positive integer number of symbol(s), where the number of symbol(s) comprised in the first symbol interval is used to determine the first time interval length.

In one embodiment, the statement in the claims that "the first signaling is used to determine a first time interval length" includes the following meaning: the first receiver in the present application receives a third information block, the third information block being used to determine Q1 candidate time interval lengths, where Q1 is a positive integer greater than 1, the first time interval length is one of the Q1 candidate time interval lengths, and the first signaling is used to determine the first time interval length out of the Q1 candidate time interval lengths.

In one embodiment, the first time interval length is measured in milliseconds (ms).

In one embodiment, the first time interval length is expressed in a number of symbols.

In one embodiment, the first time interval length is expressed in a number of slots.

In one embodiment, the first time interval length is expressed in a number of symbols/a number of slots corresponding to a target subcarrier spacing, where the target subcarrier spacing is equal to one of a subcarrier spacing (SCS) used by the first signaling or a subcarrier spacing (SCS) used by the first signal.

In one embodiment, the first time interval length is expressed in a number of symbols/a number of slots corresponding to a target subcarrier spacing, where the target subcarrier spacing is equal to a larger value between a subcarrier spacing (SCS) used by the first signaling and a subcarrier spacing (SCS) used by the first signal.

In one embodiment, the first time interval length is expressed in a number of symbols/a number of slots corresponding to a target subcarrier spacing, where the target subcarrier spacing is equal to a smaller value between a subcarrier spacing (SCS) used by the first signaling and a subcarrier spacing (SCS) used by the first signal.

In one embodiment, the first time interval length is larger than the target symbol spacing in the present application.

In one embodiment, the first time interval length is equal to the target symbol spacing in the present application.

In one embodiment, the first time interval length is smaller than the target symbol spacing in the present application.

In one embodiment, the first time interval length is equal to $K_0$.

In one embodiment, the statement in the claims that "a length of a time interval in time domain between a first PDCCH occasion and the first signal" includes the following meaning: a length of a time interval between an end time of the first PDCCH occasion and a start time of the first signal in time domain.

In one embodiment, the statement in the claims that "a length of a time interval in time domain between a first PDCCH occasion and the first signal" includes the following meaning: a length of a time interval between a start time of the first PDCCH occasion and a start time of the first signal in time domain.

In one embodiment, the statement in the claims that "a length of a time interval in time domain between a first PDCCH occasion and the first signal" includes the following meaning: a length of a time interval between a slot to which the first PDCCH occasion belongs and a slot to which the first signal belongs in time domain.

In one embodiment, the statement in the claims that "a length of a time interval in time domain between a first PDCCH occasion and the first signal" includes the following meaning: a length of a time interval between a slot to which the first PDCCH occasion belongs and a slot to which a starting symbol comprised in the first signal belongs in time domain.

In one embodiment, the statement in the claims that "a length of a time interval in time domain between a first PDCCH occasion and the first signal" includes the following meaning: a length of a time interval between an ending symbol comprised in the first PDCCH occasion and a starting symbol occupied by the first signal in time domain.

In one embodiment, the statement in the claims that "a length of a time interval in time domain between a first PDCCH occasion and the first signal" includes the following meaning: a length of a time interval between a starting symbol comprised in the first PDCCH occasion and a starting symbol occupied by the first signal in time domain.

In one embodiment, the statement in the claims that "the first time interval length being used to determine a length of a time interval in time domain between a first PDCCH occasion and the first signal" includes the following meaning: the first time interval length is used by the first node in the present application to determine a length of a time interval between the first PDCCH occasion and the first signal in time domain.

In one embodiment, the statement in the claims that "the first time interval length being used to determine a length of a time interval in time domain between a first PDCCH occasion and the first signal" includes the following meaning: the first time interval length is equal to a length of a time interval between the first PDCCH occasion and the first signal in time domain.

In one embodiment, the statement in the claims that "the first time interval length being used to determine a length of a time interval in time domain between a first PDCCH occasion and the first signal" includes the following meaning: the first time interval length is equal to a length of a time interval between an end time of a slot to which the first PDCCH occasion belongs and a start time of the first signal in time domain.

In one embodiment, the statement in the claims that "the first time interval length being used to determine a length of a time interval in time domain between a first PDCCH occasion and the first signal" includes the following meaning: the first time interval length is used for calculating a length of a time interval between the first PDCCH occasion and the first signal in time domain.

In one embodiment, the statement in the claims that "the first time interval length being used to determine a length of a time interval in time domain between a first PDCCH occasion and the first signal" includes the following meaning: the first time interval length is no larger than a length of a time interval between the first PDCCH occasion and the first signal in time domain.

In one embodiment, the statement in the claims that "the first time interval length being used to determine a length of a time interval in time domain between a first PDCCH occasion and the first signal" includes the following meaning: the first time interval length is equal to a length of a time interval between a slot to which the first PDCCH occasion belongs and a slot to which a starting symbol comprised in the first signal belongs in time domain.

In one embodiment, the number of bit(s) comprised in the first bit sub-block is equal to 1.

In one embodiment, the number of bits comprised in the first bit sub-block is greater than 1.

In one embodiment, bit(s) comprised in the first bit sub-block is(are) used for carrying HARQ-ACK information.

In one embodiment, bit(s) comprised in the first bit sub-block is(are) used for carrying HARQ-ACK information of a Transport Block (TB).

In one embodiment, bit(s) comprised in the first bit sub-block is(are) used for carrying HARQ-ACK information of a Code Block Group (CBG).

In one embodiment, bit(s) comprised in the first bit sub-block is(are) used for carrying HARQ-ACK information of a Transport Block (TB) and HARQ-ACK information of a Code Block Group (CBG).

In one embodiment, any bit comprised in the first bit sub-block belongs to the first bit block.

In one embodiment, the first bit block only comprises bit(s) comprised in the first bit sub-block.

In one embodiment, the first bit block also comprises bit(s) other than the first bit sub-block.

In one embodiment, the statement of "a position of the first signal in time domain" in the claims includes: a position of a symbol occupied in time domain by the first signal in time domain.

In one embodiment, the statement of "a position of the first signal in time domain" in the claims includes: an index of a slot to which a starting symbol occupied by the first signal in time domain belongs.

In one embodiment, the statement of "a position of the first signal in time domain" in the claims includes: an index of a slot to which an ending symbol occupied by the first signal in time domain belongs.

In one embodiment, the statement of "a position of the first signal in time domain" in the claims includes: an index of a starting symbol occupied by the first signal in time domain in a slot to which the starting symbol belongs.

In one embodiment, the statement of "a position of the first signal in time domain" in the claims includes: an index of an ending symbol occupied by the first signal in time domain in a slot to which the ending symbol belongs.

In one embodiment, the statement of "a position of the first signal in time domain" in the claims includes: an index of a slot to which a starting symbol occupied by the first signal in time domain belongs and an index of a starting symbol occupied by the first signal in time domain in a slot to which the starting symbol belongs.

In one embodiment, the statement of "a position of the first signal in time domain" in the claims includes: an index of a slot to which an ending symbol occupied by the first signal in time domain belongs and an index of an ending symbol occupied by the first signal in time domain in a slot to which the ending symbol belongs.

In one embodiment, the statement of "a position of the second signal in time domain" in the claims includes: a position of a symbol occupied in time domain by the second signal in time domain.

In one embodiment, the statement of "a position of the second signal in time domain" in the claims includes: an index of a slot to which a starting symbol occupied by the second signal in time domain belongs.

In one embodiment, the statement of "a position of the second signal in time domain" in the claims includes: an index of a starting symbol occupied by the second signal in time domain in a slot to which the starting symbol belongs.

In one embodiment, the statement of "a position of the second signal in time domain" in the claims includes: an index of a slot to which a starting symbol occupied by the second signal in time domain belongs and an index of a starting symbol occupied by the second signal in time domain in a slot to which the starting symbol belongs.

In one embodiment, the first signaling is also used to determine a position of the second signal in time domain.

In one embodiment, the statement in the claims that "a position of the first signal in time domain is used to determine a position of the second signal in time domain" includes the following meaning: a position of the first signal in time domain is used by the first node in the present application to determine a position of the second signal in time domain.

In one embodiment, the statement in the claims that "a position of the first signal in time domain is used to determine a position of the second signal in time domain" includes the following meaning: a position of the first signal in time domain is used together with a second time interval length to determine a position of the second signal in time domain, where the second time interval length is a length of a time interval between the first signal and the second signal in time domain.

In one embodiment, the statement in the claims that "a position of the first signal in time domain is used to determine a position of the second signal in time domain" includes the following meaning: a position of the first signal in time domain is used together with a second time interval length to determine a position of the second signal in time domain, where the first signaling in the present application indicates the second time interval length.

In one embodiment, the statement in the claims that "a position of the first signal in time domain is used to determine a position of the second signal in time domain" includes the following meaning: a position of the first signal in time domain is used together with a second time interval length to determine a position of the second signal in time domain, where the first receiver in the present application receives a fourth information block, the fourth information block indicating the second time interval length.

In one embodiment, the statement in the claims that "a position of the first signal in time domain is used to determine a position of the second signal in time domain" includes the following meaning: a position of the first signal in time domain is used together with a second time interval length to determine a position of the second signal in time domain, where the first information block in the present application indicates the second time interval length.

In one embodiment, the statement of "a bit value of the first bit sub-block" in the claims includes: a value of a bit comprised in the first bit sub-block.

In one embodiment, a bit value of any bit comprised in the first bit sub-block is one of "0" or "1".

In one embodiment, a bit value of any bit comprised in the first bit sub-block is one of "TRUE" or "FALSE".

In one embodiment, a bit value of the first bit sub-block is BOOLEAN.

In one embodiment, a bit value of the first bit sub-block is an INTEGER.

In one embodiment, a bit value of the first bit sub-block is a binary value.

In one embodiment, a bit value of the first bit sub-block is a STRING.

In one embodiment, the statement of "a bit value of the first bit sub-block" in the claims includes: a combined value of all bits comprised in the first bit sub-block.

In one embodiment, the statement of "a bit value of the first bit sub-block" in the claims includes: a combined state of all bits comprised in the first bit sub-block.

In one embodiment, the statement that "whether the first signal is correctly received" in the claims includes the following meaning: whether the first signal is correctly decoded.

In one embodiment, the statement that "whether the first signal is correctly received" in the claims includes the following meaning: whether HARQ-ACK information of the first signal generated by the first node is an ACK or a NACK.

In one embodiment, the statement that "whether the first signal is correctly received" in the claims includes the following meaning: whether CRC check of the first signal is passed.

In one embodiment, the statement that "whether the first signal is correctly received" in the claims includes the following meaning: whether channel decoding of bit(s) carried by the first signal is successful.

In one embodiment, the statement that "whether the first signal is correctly received" in the claims includes the following meaning: whether a Transport block (TB) carried by the first signal is correctly decoded.

In one embodiment, the statement that "whether the first signal is correctly received" in the claims includes the following meaning: whether each Code Block (CB) carried by the first signal is correctly decoded.

In one embodiment, the statement that "whether the first signal is correctly received being used to determine a bit value of the first bit sub-block" in the claims includes the following meaning: whether the first signal is correctly received is used by the first node in the present application for determining a bit value of the first bit sub-block.

In one embodiment, the statement that "whether the first signal is correctly received being used to determine a bit value of the first bit sub-block" in the claims includes the following meaning: whether the first signal is correctly received is used for determining a bit value of the first bit sub-block according to a given relationship of correspondence.

In one embodiment, the statement that "whether the first signal is correctly received being used to determine a bit value of the first bit sub-block" in the claims includes the following meaning: whether the first signal is correctly received is used for determining a bit value of the first bit sub-block according to a conditional relation.

In one embodiment, the statement that "whether the first signal is correctly received being used to determine a bit value of the first bit sub-block" in the claims includes the following meaning: when the first signal is correctly received, a bit value of the first bit sub-block is equal to a first bit value; when the first signal is not correctly received, a bit value of the first bit sub-block is equal to a second bit value, where the first bit value and the second bit value are unequal. In one subsidiary embodiment of the above embodiment, the first bit value is equal to a bit value with each bit being "1", and the second bit value is equal to a bit value with each bit being "0". In one subsidiary embodiment of the above embodiment, the first bit value is equal to a bit value with each bit being "0", and the second bit value is equal to a bit value with each bit being "1".

In one embodiment, the first PDCCH occasion and the second PDCCH occasion are a same PDCCH MO.

In one embodiment, the first PDCCH occasion and the second PDCCH occasion are different.

In one embodiment, the first PDCCH occasion and the second PDCCH occasion are two different PDCCH occasions.

In one embodiment, the second PDCCH occasion is the first PDCCH occasion.

In one embodiment, the first PDCCH occasion and the second PDCCH occasion comprise totally identical time-domain resources.

In one embodiment, the first PDCCH occasion and the second PDCCH occasion comprise totally identical time-domain symbols.

In one embodiment, the first PDCCH occasion and the second PDCCH occasion comprise different time-domain resources.

In one embodiment, the first PDCCH occasion and the second PDCCH occasion comprise different time-domain symbols.

In one embodiment, the statement in the claims that "a second PDCCH occasion is used to determine the first bit sub-block in the first bit block" includes the following meaning: the second PDCCH occasion is used by the first node in the present application for determining the first bit sub-block in the first bit block.

In one embodiment, the statement in the claims that "a second PDCCH occasion is used to determine the first bit sub-block in the first bit block" includes the following meaning: a Downlink Assignment Index (DAD) comprised in the first signaling is used together with the second PDCCH occasion for determining the first bit sub-block in the first bit block.

In one embodiment, the statement in the claims that "a second PDCCH occasion is used to determine the first bit sub-block in the first bit block" includes the following meaning: an index of the second PDCCH occasion is used for determining the first bit sub-block in the first bit block.

In one embodiment, the statement in the claims that "a second PDCCH occasion is used to determine the first bit sub-block in the first bit block" includes the following meaning: an index of the second PDCCH occasion is used for determining the first bit sub-block in the first bit block according to a Pseudo-Code.

In one embodiment, the statement in the claims that "a second PDCCH occasion is used to determine the first bit sub-block in the first bit block" is implemented by means of the claim 2 in the present application, where the first PDCCH occasion and the second PDCCH occasion are identical.

In one embodiment, the statement in the claims that "a second PDCCH occasion is used to determine the first bit sub-block in the first bit block" is implemented by means of the claim 3 in the present application.

Embodiment 2

Figure 2:
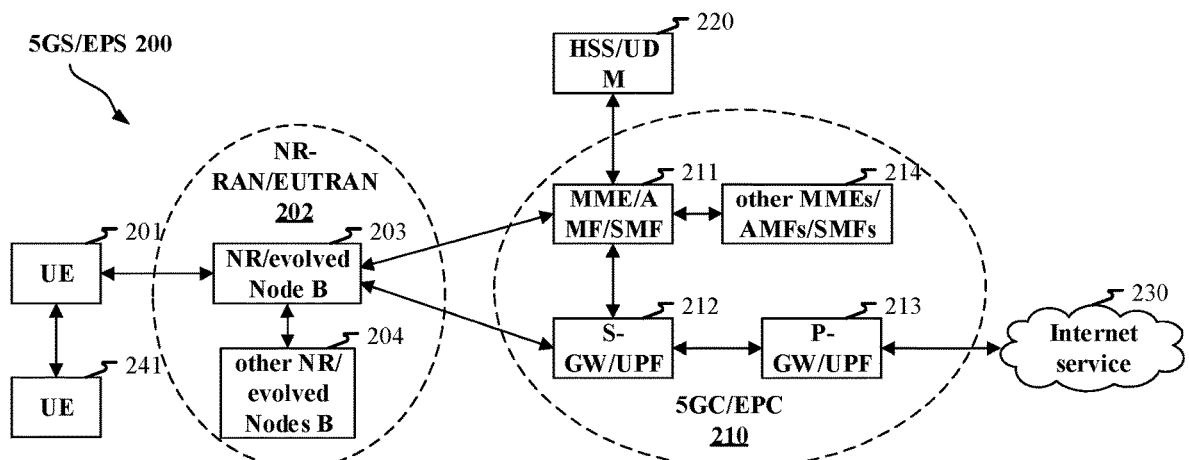
FIG. 2 illustrates a schematic diagram of a network architecture according to one embodiment of the present application.

Embodiment 2 illustrates a schematic diagram of a network architecture according to the present application, as shown in FIG. 2. FIG. 2 is a diagram illustrating a network architecture 200 of 5G NR, Long-Term Evolution (LTE) and Long-Term Evolution Advanced (LTE-A) systems. The 5G NR or LTE network architecture 200 may be called 5G System/Evolved Packet System (5GS/EPS) 200 or other appropriate terms. The 5GS/EPS 200 may comprise one or more UEs 201, an NG-RAN 202, a 5G-Core Network/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present application can be extended to networks providing circuit switching services or other cellular networks. The NG-RAN 202 comprises an NR/evolved node B (gNB/eNB) 203 and other gNBs(eNBs) 204. The gNB(eNB) 203 provides UE 201 oriented user plane and control plane terminations. The gNB(eNB) 203 may be connected to other gNBs(eNBs) 204 via an Xn/X2 interface (for example, backhaul). The gNB(eNB) 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB(eNB) 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB(eNB) 203 is connected with the 5G-CN/EPC 210 via an S1/NG interface. The 5G-CN/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first node in the present application.

In one embodiment, the UE 201 supports multi-TRP transmission.

In one embodiment, the UE 201 supports multi-TRP PDCCH transmission.

In one embodiment, the gNB(eNB) 203 corresponds to the second node in the present application.

In one embodiment, the gNB(eNB) 203 supports multi-TRP transmission.

In one embodiment, the gNB(eNB) 203 supports multi-TRP PDCCH transmission.

Embodiment 3

Figure 3:
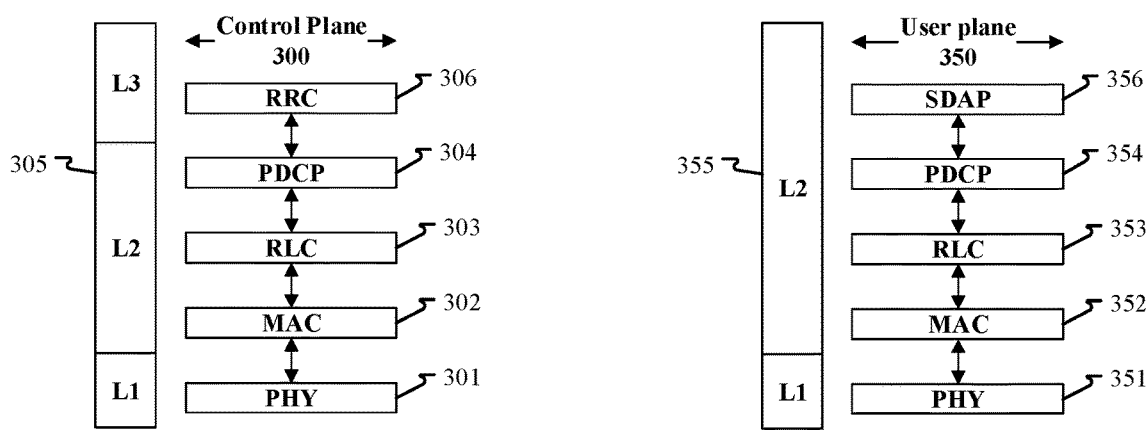
FIG. 3 illustrates a schematic diagram of a radio protocol architecture of a user plane and a control plane according to one embodiment of the present application.

Embodiment 3 illustrates a schematic diagram of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 used for a first node (UE or gNB) and a second node (gNB or UE) is represented by three layers, which are a layer 1, a layer 2 and a layer 3, respectively. The layer 1 (L1) is the lowest layer which performs signal processing functions of various PHY layers. The L1 is called PHY 301 in the present application. The layer 2 (L2) 305 is above the PHY 301, and is in charge of the link between the first node and the second node via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second nodes of the network side. The PDCP sublayer 304 provides multiplexing among variable radio bearers and logical channels. The PDCP sublayer 304 provides security by encrypting a packet and provides support for handover of a first node between second nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second node and the first node. The radio protocol architecture in the user plane 350 comprises the L1 layer and the L2 layer. In the user plane 350, the radio protocol architecture used for the first node and the second node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first information block in the present application is generated by the RRC306, or the MAC302, or the MAC352, or by the PHY301, or the PHY351.

In one embodiment, the first signaling in the present application is generated by the RRC306, or the MAC302, or the MAC352, or by the PHY301, or the PHY351.

In one embodiment, the second signaling in the present application is generated by the RRC306, or the MAC302, or the MAC352, or by the PHY301, or the PHY351.

In one embodiment, the first signal in the present application is generated by the RRC306, or the MAC302, or the MAC352, or by the PHY301, or the PHY351.

In one embodiment, the second signal in the present application is generated by the RRC306, or the MAC302, or the MAC352, or by the PHY301, or the PHY351.

In one embodiment, the second information block in the present application is generated by the RRC306, or the MAC302, or the MAC352, or by the PHY301, or the PHY351.

Embodiment 4

Figure 4:
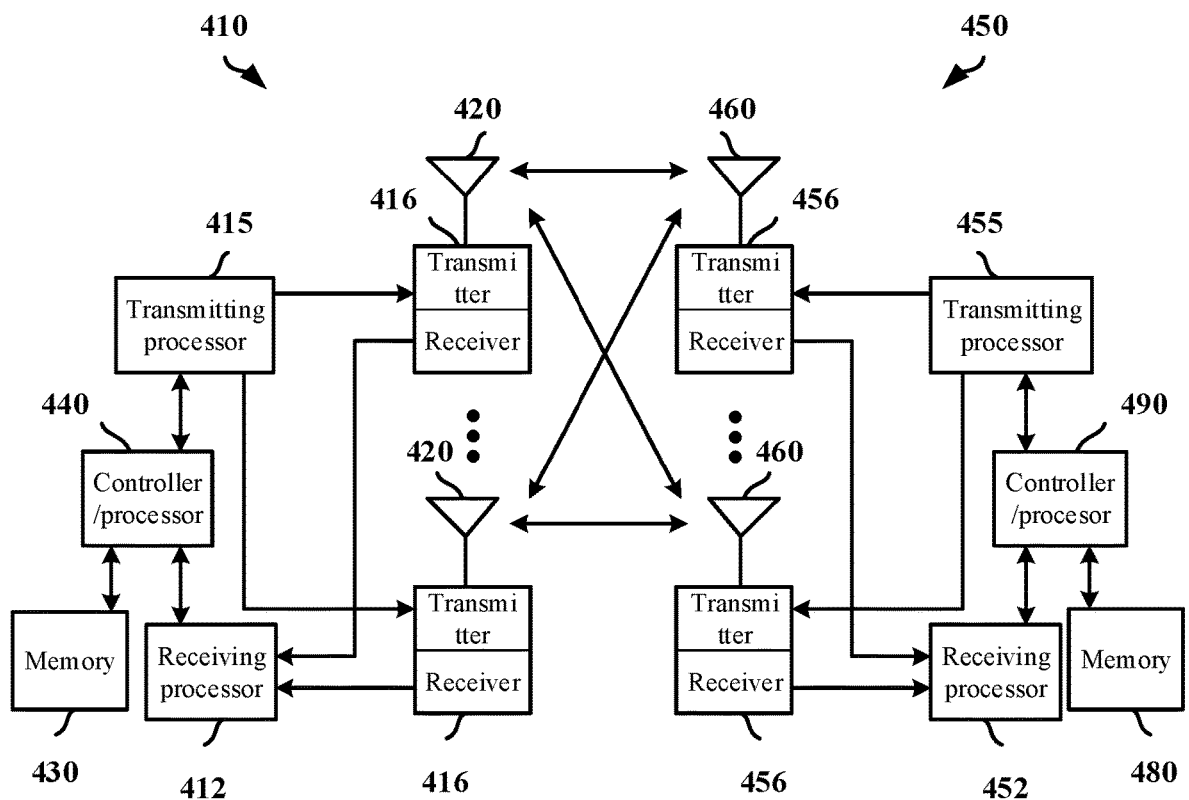
FIG. 4 illustrates a schematic diagram of a first node and a second node according to one embodiment of the present application.

Embodiment 4 illustrates a schematic diagram of a first node and a second node according to the present application, as shown in FIG. 4.

The first node (450) can comprise a controller/processor 490, a data source/buffer 480, a receiving processor 452, a transmitter/receiver 456 and a transmitting processor 455, where the transmitter/receiver 456 comprises an antenna 460.

The second node (410) can comprise a controller/processor 440, a data source/buffer 430, a receiving processor 412, a transmitter/receiver 416 and a transmitting processor 415, where the transmitter/receiver 416 comprises an antenna 420.

In Downlink (DL), a higher layer packet, for instance higher-layer information contained in the first information block and the first signal in the present application is provided to the controller/processor 440. The controller/processor 440 provides functions of the L2 layer and above. In DL, the controller/processor 440 provides header compression, encryption, packet segmentation and reordering, multiplexing between a logical channel and a transport channel as well as radio resources allocation for the first node 450 based on various priorities. The controller/processor 440 is also responsible for HARQ operation, a retransmission of a lost packet and a signaling to the first node 450, for instance, higher-layer information carried in the first information block and the first signal is generated in the controller/processor 440. The transmitting processor 415 performs various signal processing functions used for the L1 (that is, PHY), including coding, interleaving, scrambling, modulating, power control/allocating, pre-coding and physical layer control signaling generation, for example, the generations of a physical-layer signal of the first signal, a physical-layer signal carrying the first information block, the first signaling and the second signaling in the present application are completed in the transmitting processor 415. Modulation symbols that have been generated are divided into parallel streams and each of them is mapped onto a corresponding multicarrier subcarrier and/or multicarrier symbol, and then is mapped by the transmitting processor 415 to the antenna 420 via the transmitter 416 to be transmitted in the form of radio frequency signals. At the receiving end, each receiver 456 receives a radio frequency signal via a corresponding antenna 460, and recovers baseband information modulated onto a radio frequency carrier and provides the baseband information to the receiving processor 452. The receiving processor 452 performs various signal receiving processing functions used for the L1. Signal receiving processing functions include receiving a physical layer signal of the first signal, a physical layer signal carrying the first information block, the first signaling and the second signaling in the present application, and demodulating multicarrier symbols in multicarrier symbol streams based on various modulation schemes (i.e., BPSK, QPSK), then de-scrambling, decoding and de-interleaving to recover data or control signal transmitted by the second node 410 on a physical channel, and providing the data and control signal to the controller/processor 490. The controller/processor 490 is in charge of the L2 and above layers, the controller/processor 490 interprets higher-layer information comprised in the first information block and the first signal in the present application. The controller/processor can be associated with the memory 480 that stores program code and data; the memory 480 may be called a computer readable medium.

In UL transmission, which is similar to DL, higher-layer information, including higher-layer information carried by the second information block and the second signal in the present application (if the second signal carries higher-layer information), upon generation in the controller/processor 490, is through the transmitting processor 455 to perform signal transmitting processing functions used for the L1 (that is, PHY), for instance, a physical layer signal carrying the second information block and a physical layer signal of the second signal in the present application are generated in the transmitting processor 455, and is then mapped to the antenna 460 via the transmitter 456 from the transmitting processor 455 and transmitted in the form of radio frequency signals. The receiver 416 receives a radio frequency signal via a corresponding antenna 420, and each receiver 416 recovers baseband information modulated onto a radio frequency carrier and provides the baseband information to the receiving processor 412. The receiving processor 412 performs various signal reception processing functions used for L1 (i.e., PHY), including receiving a physical layer signal carrying the second information block and a physical layer signal of the second signal in the present application and then providing data and/or control signal to the controller/processor 440. The functions of L2 performed by the controller/processor 440 include interpreting higher-layer information carried by the second information block and the second signal (if the second signal carries higher-layer information) in the present application. The controller/processor can be associated with the buffer 430 that stores program code and data; the buffer 430 may be called a computer readable medium.

In one embodiment, the first node 450 comprises at least one processor and at least one memory, the at least one memory comprises computer program codes; The at least one memory and the computer program codes are configured to be used in collaboration with the at least one processor. The first node 450 at least receives a first information block, the first information block being used to determine X1 PDCCH occasions, where X1 is a positive integer greater than 1; receives a first signaling and receiving a first signal, the first signal occupying a first frequency-domain resource set in frequency domain, and the first signaling being used to determine the first frequency-domain resource set; and transmits a second signal, the second signal carrying a first bit block, the first bit block comprising at least one bit; herein, the first signaling is used to determine a first time interval length, the first time interval length being used to determine a length of a time interval in time domain between a first PDCCH occasion and the first signal, the first PDCCH occasion being one of the X1 PDCCH occasions; the first bit block comprises a first bit sub-block, the first bit sub-block comprising at least one bit; a position of the first signal in time domain is used to determine a position of the second signal in time domain, whether the first signal is correctly received being used to determine a bit value of the first bit sub-block; a second PDCCH occasion is used to determine the first bit sub-block in the first bit block, where the second PDCCH occasion is one of the X1 PDCCH occasions.

In one embodiment, the first node 450 comprises a memory that stores a computer readable instruction program, the computer readable instruction program generates actions when executed by at least one processor, which include: receiving a first information block, the first information block being used to determine X1 PDCCH occasions, where X1 is a positive integer greater than 1; receiving a first signaling and receiving a first signal, the first signal occupying a first frequency-domain resource set in frequency domain, and the first signaling being used to determine the first frequency-domain resource set; and transmitting a second signal, the second signal carrying a first bit block, the first bit block comprising at least one bit; herein, the first signaling is used to determine a first time interval length, the first time interval length being used to determine a length of a time interval in time domain between a first PDCCH occasion and the first signal, the first PDCCH occasion being one of the X1 PDCCH occasions; the first bit block comprises a first bit sub-block, the first bit sub-block comprising at least one bit; a position of the first signal in time domain is used to determine a position of the second signal in time domain, whether the first signal is correctly received being used to determine a bit value of the first bit sub-block; a second PDCCH occasion is used to determine the first bit sub-block in the first bit block, where the second PDCCH occasion is one of the X1 PDCCH occasions.

In one embodiment, the second device 410 comprises at least one processor and at least one memory, the at least one memory comprises computer program codes; the at least one memory and the computer program codes are configured to be used in collaboration with the at least one processor. The second device 410 at least: transmits a first information block, the first information block being used to indicate X1 PDCCH occasions, where X1 is a positive integer greater than 1; transmits a first signaling and transmits a first signal, the first signal occupying a first frequency-domain resource set in frequency domain, and the first signaling being used to indicate the first frequency-domain resource set; and receives a second signal, the second signal carrying a first bit block, the first bit block comprising at least one bit; herein, the first signaling is used to indicate a first time interval length, the first time interval length being used to determine a length of a time interval in time domain between a first PDCCH occasion and the first signal, the first PDCCH occasion being one of the X1 PDCCH occasions; the first bit block comprises a first bit sub-block, the first bit sub-block comprising at least one bit; a position of the first signal in time domain is used to determine a position of the second signal in time domain, whether the first signal is correctly received being used to determine a bit value of the first bit sub-block; a second PDCCH occasion is used to determine the first bit sub-block in the first bit block, where the second PDCCH occasion is one of the X1 PDCCH occasions.

In one embodiment, the second node 410 comprises a memory that stores a computer readable instruction program, the computer readable instruction program generates actions when executed by at least one processor, which include: transmitting a first information block, the first information block being used to indicate X1 PDCCH occasions, where X1 is a positive integer greater than 1; transmitting a first signaling and transmitting a first signal, the first signal occupying a first frequency-domain resource set in frequency domain, and the first signaling being used to indicate the first frequency-domain resource set; and receiving a second signal, the second signal carrying a first bit block, the first bit block comprising at least one bit; herein, the first signaling is used to indicate a first time interval length, the first time interval length being used to determine a length of a time interval in time domain between a first PDCCH occasion and the first signal, the first PDCCH occasion being one of the X1 PDCCH occasions; the first bit block comprises a first bit sub-block, the first bit sub-block comprising at least one bit; a position of the first signal in time domain is used to determine a position of the second signal in time domain, whether the first signal is correctly received being used to determine a bit value of the first bit sub-block; a second PDCCH occasion is used to determine the first bit sub-block in the first bit block, where the second PDCCH occasion is one of the X1 PDCCH occasions.

In one embodiment, the first node 450 is a UE.

In one embodiment, the first node 450 is a UE supporting multi-TRP transmissions.

In one embodiment, the first node 450 is a UE supporting multi-TRP PDCCH transmissions.

In one embodiment, the second node 410 is a base station (gNB/eNB).

In one embodiment, the second node 410 is a base station supporting multi-TRP transmissions.

In one embodiment, the second node 410 is a base station supporting multi-TRP PDCCH transmissions.

In one embodiment, the receiver 456 (comprising the antenna 460), the receiving processor 452 and the controller/processor 490 are used for receiving the first information block in the present application.

In one embodiment, the receiver 456 (comprising the antenna 460) and the receiving processor 452 are used for receiving the first signaling in the present application.

In one embodiment, the receiver 456 (comprising the antenna 460) and the receiving processor 452 are used for receiving the second signaling in the present application.

In one embodiment, the receiver 456 (comprising the antenna 460), the receiving processor 452 and the controller/processor 490 are used for receiving the first signal in the present application.

In one embodiment, the transmitter 456 (comprising the antenna 460) and the transmitting processor 455 are used for transmitting the second signal in the present application.

In one embodiment, the transmitter 456 (comprising the antenna 460), the transmitting processor 455 and the controller/processor 490 are used for transmitting the second signal in the present application.

In one embodiment, the transmitter 456 (comprising the antenna 460), the transmitting processor 455 and the controller/processor 490 are used for transmitting the second information block in the present application.

In one embodiment, the transmitter 416 (comprising the antenna 420), the transmitting processor 415 and the controller/processor 440 are used for transmitting the first information block in the present application.

In one embodiment, the transmitter 416 (comprising the antenna 420) and the transmitting processor 415 are used for transmitting the first signaling in the present application.

In one embodiment, the transmitter 416 (comprising the antenna 420) and the transmitting processor 415 are used for transmitting the second signaling in the present application.

In one embodiment, the transmitter 416 (comprising the antenna 420), the transmitting processor 415 and the controller/processor 440 are used for transmitting the first signal in the present application.

In one embodiment, the receiver 416 (comprising the antenna 420) and the receiving processor 412 are used for receiving the second signal in the present application.

In one embodiment, the receiver 416 (comprising the antenna 420), the receiving processor 412 and the controller/processor 440 are used for receiving the second signal in the present application.

In one embodiment, the receiver 416 (comprising the antenna 420), the receiving processor 412 and the controller/ processor 440 are used for receiving the second information block in the present application.

Embodiment 5

Figure 5:
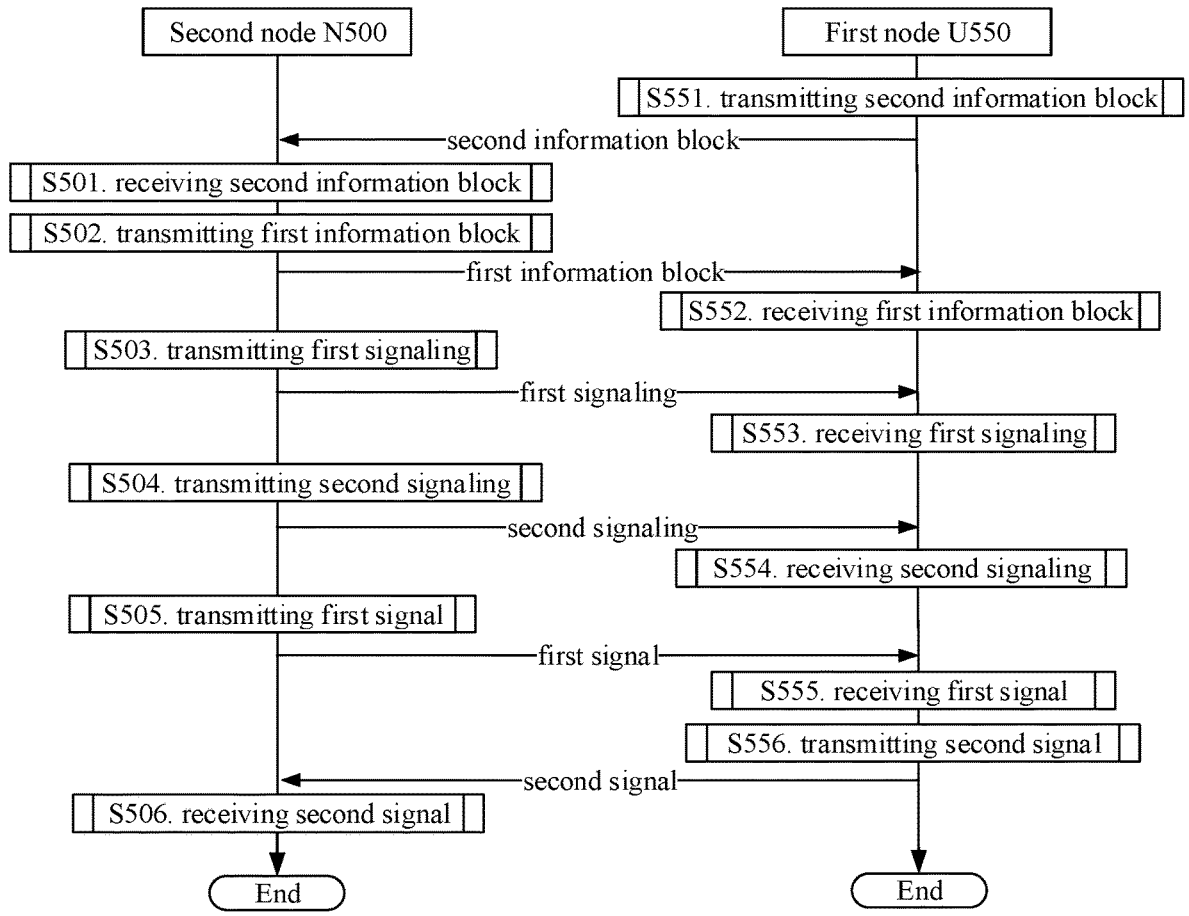
FIG. 5 illustrates a flowchart of radio signal transmission according to one embodiment of the present application.

Embodiment 5 illustrates a flowchart of radio signal transmission according to one embodiment of the present application, as shown in FIG. 5. In FIG. 5, a second node N500 is a maintenance base station for a serving cell for a first node U550. It should be particularly noted that the sequence illustrated herein does not set any limit to the signal transmission order or implementation order in the present application.

The second node N500 receives a second information block in step S501, transmits a first information block in step S502, transmits a first signaling in step S503, and transmits a second signaling in step S504, transmits a first signal in step S505, and receives a second signal in step S506.

The first node U550 transmits a second information block in step S551, receives a first information block in step S552, receives a first signaling in step S553, and receives a second signaling in step S554, receives a first signal in step S555, and transmits a second signal in step S556.

In Embodiment 5, the first information block is used to determine X1 PDCCH occasions, where X1 is a positive integer greater than 1; the first signal occupies a first frequency-domain resource set in frequency domain, and the first signaling is used to determine the first frequency-domain resource set; and the second signal carries a first bit block, the first bit block comprising at least one bit; herein, the first signaling is used to determine a first time interval length, the first time interval length being used to determine a length of a time interval in time domain between a first PDCCH occasion and the first signal, the first PDCCH occasion being one of the X1 PDCCH occasions; the first bit block comprises a first bit sub-block, the first bit sub-block comprising at least one bit; a position of the first signal in time domain is used to determine a position of the second signal in time domain, whether the first signal is correctly received being used to determine a bit value of the first bit sub-block; a second PDCCH occasion is used to determine the first bit sub-block in the first bit block, where the second PDCCH occasion is one of the X1 PDCCH occasions; a PDCCH candidate occupied by the second signaling is different from a PDCCH candidate occupied by the first signaling; the second information block is used to indicate at least one of whether the first node supports PDCCH candidates being mutually linked or a linkage type between mutually linked PDCCH candidates supported by the first node.

In one embodiment, the second information block is transmitted via an air interface.

In one embodiment, the second information block is transmitted via a radio interface.

In one embodiment, the second information block comprises all or part of an upper layer signaling.

In one embodiment, the second information block comprises all or part of a physical layer signaling.

In one embodiment, the second information block comprises all or part of a Radio Resource Control (RRC) signaling.

In one embodiment, the second information block comprises all or part of a Medium Access Control (MAC) layer signaling.

In one embodiment, the second information block is transmitted through an Uplink Shared Channel (UL-SCH).

In one embodiment, the second information block is transmitted through a Physical Uplink Shared Channel (PUSCH).

In one embodiment, the second information block is transmitted through a Physical Uplink Control Channel (PUCCH).

In one embodiment, the second information block comprises Uplink control information (UCI).

In one embodiment, the second information block is used to indicate capabilities of the first node in the present application.

In one embodiment, the second information block indicates a capability of the first node in the present application for combined decoding of PDCCH.

In one embodiment, the second information block indicates a capability of the first node in the present application for supporting Multi-Chance DCI transmission.

In one embodiment, the second information block indicates a capability of the first node in the present application for supporting two PDCCH Candidates being mutually linked.

In one embodiment, the second information block indicates a capability of the first node in the present application for supporting two PDCCH Candidates in scheduling a same TB.

In one embodiment, the statement in the claims that "the second information block is used to indicate at least one of whether the first node supports PDCCH candidates being mutually linked or a linkage type between mutually linked PDCCH candidates supported by the first node" comprises the following meaning: the second information block is used to indicate whether the first node supports two PDCCH candidates being mutually linked, and when the first node supports two PDCCH candidates being mutually linked, the second information block is used to indicate a linkage type between two mutually linked PDCCH candidates supported by the first node.

In one embodiment, the statement in the claims that "the second information block is used to indicate at least one of whether the first node supports PDCCH candidates being mutually linked or a linkage type between mutually linked PDCCH candidates supported by the first node" comprises the following meaning: the second information block is only used to indicate whether the first node supports two PDCCH candidates being mutually linked.

In one embodiment, the statement in the claims that "the second information block is used to indicate at least one of whether the first node supports PDCCH candidates being mutually linked or a linkage type between two mutually linked PDCCH candidates supported by the first node" comprises the following meaning: the second information block is only used to indicate a linkage type between two mutually linked PDCCH candidates supported by the first node.

In one embodiment, the statement of "a linkage type between two mutually linked PDCCH candidates" in the claims comprises a Combining type between two PDCCH candidates.

In one embodiment, the statement of "a linkage type between two mutually linked PDCCH candidates" in the claims comprises whether Soft Combining is supported between two PDCCH candidates.

In one embodiment, the statement of "a linkage type between two mutually linked PDCCH candidates" in the claims comprises whether two repetitions of a same DCI is supported between two PDCCH candidates.

In one embodiment, the statement of "a linkage type between two mutually linked PDCCH candidates" in the claims comprises whether scheduling a same signal or channel is supported between two PDCCH candidates.

In one embodiment, the statement of "a linkage type between two mutually linked PDCCH candidates" in the claims comprises a Combining type between PDCCHs transmitted respectively by two PDCCH candidates.

In one embodiment, the statement of "a linkage type between two mutually linked PDCCH candidates" in the claims is one of a first linkage type or a second linkage type, where the first linkage type comprises that PDCCHs respectively transmitted by two PDCCH candidates can be Soft Combining, while the second linkage type comprises that PDCCHs respectively transmitted by two PDCCH candidates cannot be Soft Combining.

In one embodiment, the statement of "a linkage type between two mutually linked PDCCH candidates" in the claims is one of a first linkage type or a second linkage type, where the first linkage type comprises that PDCCHs respectively transmitted by two PDCCH candidates can be Soft Combining, while the second linkage type comprises that between PDCCHs respectively transmitted by two PDCCH candidates there exists Multi-chance DCI transmission.

In one embodiment, the statement of "a linkage type between two mutually linked PDCCH candidates" in the claims is one of a first linkage type or a second linkage type, where the first linkage type comprises that two PDCCH candidates are used for carrying two Repetitions of a same DCI Payload, while the second linkage type comprises that two PDCCH candidates respectively carry two independent transmissions of two DCI Payloads.

In one embodiment, the statement of "a linkage type between two mutually linked PDCCH candidates" in the claims is one of a first linkage type or a second linkage type, where the first linkage type comprises that two PDCCH candidates can be assumed to be carrying two Repetitions of a same DCI Payload, while the second linkage type comprises that two PDCCH candidates cannot be assumed to be respectively carrying two Repetitions of a same DCI Payload.

In one embodiment, the second information block comprises one or more fields in an IE "Phy-Parameters".

Embodiment 6

Figure 6:
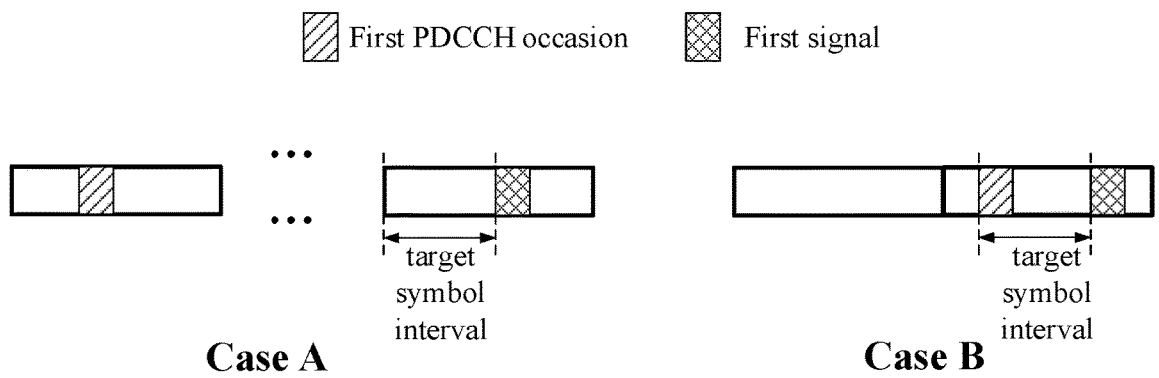
FIG. 6 illustrates a schematic diagram of a target symbol spacing according to one embodiment of the present application.

Embodiment 6 illustrates a schematic diagram of a target symbol spacing according to one embodiment of the present application, as shown in FIG. 6. In FIG. 6, as shown in Case A and Case B, each blank rectangle framed with thick solid lines represents a slot, the small slash-filled rectangle represents a first PDCCH occasion, while the small cross-filled rectangle represents a first signal; in Case A, the first PDCCH occasion and the first signal are in different slots; in Case B, the first PDCCH occasion and the first signal are in a same slot.

In Embodiment 6, the first signaling in the present application is used to determine a target symbol spacing, the target symbol spacing being used to determine a starting symbol occupied by the first signal in the present application in time domain, and a number of symbols comprised in the target symbol spacing being used to determine the first time interval length in the present application; whether the first PDCCH occasion and the first signal in the present application belong to a same slot is used to determine whether a starting symbol comprised in the first PDCCH occasion is used to determine the first bit sub-block of the present application in the first bit block of the present application, where the number of symbols comprised in the target symbol spacing is used to determine the first bit sub-block in the first bit block.

In one embodiment, the target symbol spacing comprises a positive integer number of Symbol(s).

In one embodiment, the number of symbol(s) comprised in the target symbol spacing is equal to 0.

In one embodiment, the target symbol spacing comprises a positive integer number of time-domain consecutive symbols.

In one embodiment, the target symbol spacing comprises a non-negative integer number of Symbol(s).

In one embodiment, the target symbol spacing comprises more than one Symbol.

In one embodiment, the target symbol spacing is a symbol spacing from a starting boundary of a slot to which a starting symbol occupied by the first signal in time domain belongs to a starting symbol occupied by the first signal in time domain.

In one embodiment, the target symbol spacing is a symbol spacing from a starting symbol comprised in the first PDCCH occasion to a starting symbol occupied by the first signal in time domain.

In one embodiment, the target symbol spacing is a symbol spacing from an ending boundary of a slot to which the first PDCCH occasion belongs to a starting symbol occupied by the first signal in time domain.

In one embodiment, the target symbol spacing is a symbol spacing from an ending symbol comprised in the first PDCCH occasion to a starting symbol occupied by the first signal in time domain.

In one embodiment, the number of symbol(s) comprised in the target symbol spacing is no greater than a number of symbol(s) comprised in a slot.

In one embodiment, the number of symbol(s) comprised in the target symbol spacing is less than a number of symbol(s) comprised in a slot.

In one embodiment, the number of symbol(s) comprised in the target symbol spacing is greater than a number of symbol(s) comprised in a slot.

In one embodiment, the statement in the claims that "the first signaling is used to determine a target symbol spacing" includes the following meaning: the first signaling is used by the first node in the present application to determine the target symbol spacing.

In one embodiment, the statement in the claims that "the first signaling is used to determine a target symbol spacing" includes the following meaning: the first signaling is used for explicitly indicating the target symbol spacing.

In one embodiment, the statement in the claims that "the first signaling is used to determine a target symbol spacing" includes the following meaning: the first signaling is used for implicitly indicating the target symbol spacing.

In one embodiment, the statement in the claims that "the first signaling is used to determine a target symbol spacing" includes the following meaning: a SLIV indicated by the first signaling is used to determine the target symbol spacing.

In one embodiment, the statement in the claims that "the first signaling is used to determine a target symbol spacing" includes the following meaning: the target symbol spacing is equal to a symbol spacing between a starting boundary of a slot to which a starting symbol determined by a SLIV indicated by the first signaling belongs and a starting symbol determined by the SLIV indicated by the first signaling.

In one embodiment, the statement in the claims that "the first signaling is used to determine a target symbol spacing" includes the following meaning: the target symbol spacing is a spacing between a starting symbol determined by a SLIV indicated by the first signaling and a starting symbol comprised in the first PDCCH occasion.

In one embodiment, the statement in the claims that "the first signaling is used to determine a target symbol spacing" includes the following meaning: when starting symbols respectively occupied by the first PDCCH occasion and the first signal in time domain belong to a same slot, the target symbol spacing is a spacing between a starting symbol determined by a SLIV indicated by the first signaling and a starting symbol comprised in the first PDCCH occasion; when starting symbols respectively occupied by the first PDCCH occasion and the first signal in time domain belong to two different slots, the target symbol spacing is equal to a symbol spacing between a starting boundary of a slot to which a starting symbol determined by a SLIV indicated by the first signaling belongs and a starting symbol determined by the SLIV indicated by the first signaling.

In one embodiment, the statement in the claims that "the first signaling is used to determine a target symbol spacing" includes the following meaning: a slot offset indicated by the first signaling and a SLIV indicated by the first signaling are used together to determine the number of symbol(s) comprised in the target symbol spacing.

In one embodiment, the statement in the claims that "the first signaling is used to determine a target symbol spacing" includes the following meaning: the first signaling indicates a first slot offset and a first SLIV, where the number of symbols comprised in the target symbol spacing is equal to 14 times as much as a sum of a number of slots comprised in the first slot offset and an index of a starting symbol determined by the first SLIV.

In one embodiment, the statement in the claims that "the first signaling is used to determine a target symbol spacing" includes the following meaning: the first signaling indicates a first slot offset and a first SLIV, where the number of symbols comprised in the target symbol spacing is equal to 12 times as much as a sum of a number of slots comprised in the first slot offset and an index of a starting symbol determined by the first SLIV.

In one embodiment, the statement in the claims that "the first signaling is used to determine a target symbol spacing" includes the following meaning: the first signaling is used to determine a number of symbol(s) comprised in the target symbol spacing.

In one embodiment, the statement in the claims that "the target symbol spacing being used to determine a starting symbol occupied by the first signal in time domain" includes the following meaning: the target symbol spacing is used by the first node in the present application to determine a starting symbol occupied by the first signal in time domain.

In one embodiment, the statement in the claims that "the target symbol spacing being used to determine a starting symbol occupied by the first signal in time domain" includes the following meaning: the target symbol spacing is a symbol spacing from a starting boundary of a slot to which a starting symbol occupied by the first signal in time domain belongs to a starting symbol occupied by the first signal in time domain.

In one embodiment, the statement in the claims that "the target symbol spacing being used to determine a starting symbol occupied by the first signal in time domain" includes the following meaning: the target symbol spacing is a symbol spacing from a starting symbol comprised in the first PDCCH occasion to a starting symbol occupied by the first signal in time domain.

In one embodiment, the statement in the claims that "the target symbol spacing being used to determine a starting symbol occupied by the first signal in time domain" includes the following meaning: when starting symbols respectively occupied by the first PDCCH occasion and the first signal in time domain belong to a same slot, the target symbol spacing is a spacing from a starting symbol comprised in the first PDCCH occasion to a starting symbol occupied by the first signal in time domain; when starting symbols respectively occupied by the first PDCCH occasion and the first signal in time domain belong to two different slots, the target symbol spacing is a symbol spacing from a starting boundary of a slot to which a starting symbol occupied by the first signal in time domain belongs to a starting symbol occupied by the first signal in time domain.

In one embodiment, the statement in the claims that "the target symbol spacing being used to determine a starting symbol occupied by the first signal in time domain" includes the following meaning: the target symbol spacing is used together with a starting symbol comprised in the first PDCCH occasion to determine a starting symbol occupied by the first signal in time domain.

In one embodiment, the statement that "a number of symbols comprised in the target symbol spacing being used to determine the first time interval length" in the claims includes the following meaning: the number of symbols comprised in the target symbol spacing is used by the first node in the present application to determine the first time interval length.

In one embodiment, the statement that "a number of symbols comprised in the target symbol spacing being used to determine the first time interval length" in the claims includes the following meaning: the number of symbols comprised in the target symbol spacing is equal to the first time interval length.

In one embodiment, the statement that "a number of symbols comprised in the target symbol spacing being used to determine the first time interval length" in the claims includes the following meaning: the first time interval length is equal to a sum of the number of symbols comprised in the target symbol spacing and a number of symbols comprised in a slot spacing indicated by the first signaling.

In one embodiment, the statement that "a number of symbols comprised in the target symbol spacing being used to determine the first time interval length" in the claims includes the following meaning: the first time interval length is equal to a time length of the target symbol spacing.

In one embodiment, the statement that "a number of symbols comprised in the target symbol spacing being used to determine the first time interval length" in the claims includes the following meaning: the first time interval length is equal to a sum of a time length of the target symbol spacing and a time length of a slot spacing indicated by the first signaling.

In one embodiment, the statement in the claims that "the target symbol spacing being used to determine a starting symbol occupied by the first signal in time domain" includes the following meaning: when starting symbols occupied by the first PDCCH occasion and the first signal in time domain belong to a same slot, the first time interval length is equal to a time length of the target symbol spacing; when starting symbols occupied by the first PDCCH occasion and the first signal in time domain belong to two different slots, the first time interval length is equal to a sum of a time length of the target symbol spacing and a time length of a slot spacing indicated by the first signaling.

In one embodiment, the statement in the claims that "whether the first PDCCH occasion and the first signal belong to a same slot is used to determine whether a starting symbol comprised in the first PDCCH occasion is used to determine the first bit sub-block in the first bit block" includes the following meaning: whether the first PDCCH occasion and the first signal belong to a same slot is used by the first node in the present application for determining whether a starting symbol comprised in the first PDCCH occasion is used to determine the first bit sub-block in the first bit block.

In one embodiment, the statement in the claims that "whether the first PDCCH occasion and the first signal belong to a same slot is used to determine whether a starting symbol comprised in the first PDCCH occasion is used to determine the first bit sub-block in the first bit block" includes the following meaning: whether starting symbols occupied by the first PDCCH occasion and the first signal in time domain belong to a same slot is used for determining whether a starting symbol comprised in the first PDCCH occasion is used to determine the first bit sub-block in the first bit block.

In one embodiment, the statement in the claims that "whether the first PDCCH occasion and the first signal belong to a same slot is used to determine whether a starting symbol comprised in the first PDCCH occasion is used to determine the first bit sub-block in the first bit block" includes the following meaning: whether all symbols occupied by the first PDCCH occasion and the first signal in time domain belong to a same slot is used for determining whether a starting symbol comprised in the first PDCCH occasion is used to determine the first bit sub-block in the first bit block.

In one embodiment, the statement in the claims that "whether the first PDCCH occasion and the first signal belong to a same slot is used to determine whether a starting symbol comprised in the first PDCCH occasion is used to determine the first bit sub-block in the first bit block" includes the following meaning: whether all symbols occupied by the first PDCCH occasion and the first signal in time domain belong to a same slot is used for determining whether an index of a starting symbol comprised in the first PDCCH occasion is used to determine the first bit sub-block in the first bit block.

In one embodiment, the statement in the claims that "whether the first PDCCH occasion and the first signal belong to a same slot is used to determine whether a starting symbol comprised in the first PDCCH occasion is used to determine the first bit sub-block in the first bit block" includes the following meaning: a relative magnitude of a sum of an index of a starting symbol comprised in the first PDCCH occasion, a starting index in a SLIV corresponding to the first signal and a length value in a SLIV corresponding to the first signal compared with a number of symbols comprised in a slot to which the first PDCCH occasion belongs is used to determine whether an index of a starting symbol comprised in the first PDCCH occasion is used to determine the first bit sub-block in the first bit block.

In one embodiment, the statement in the claims that "whether the first PDCCH occasion and the first signal belong to a same slot is used to determine whether a starting symbol comprised in the first PDCCH occasion is used to determine the first bit sub-block in the first bit block" includes the following meaning: when all symbols occupied by the first PDCCH occasion and the first signal in time domain belong to a same slot, an index of a starting symbol comprised in the first PDCCH occasion is used to determine the first bit sub-block in the first bit block; when two symbols respectively occupied by the first PDCCH occasion and the first signal in time domain belong to different slots, an index of a starting symbol comprised in the first PDCCH occasion is not used to determine the first bit sub-block in the first bit block.

In one embodiment, the statement in the claims that "whether the first PDCCH occasion and the first signal belong to a same slot is used to determine whether a starting symbol comprised in the first PDCCH occasion is used to determine the first bit sub-block in the first bit block" includes the following meaning: when all symbols occupied by the first PDCCH occasion and the first signal in time domain belong to a same slot, an index of a starting symbol comprised in the first PDCCH occasion is used to determine the first bit sub-block in the first bit block; when two symbols respectively occupied by the first PDCCH occasion and the first signal in time domain belong to different slots, an index other than an index of a starting symbol comprised in the first PDCCH occasion is used to determine the first bit sub-block in the first bit block.

In one embodiment, when a starting symbol comprised in the first PDCCH occasion is used to determine the first bit sub-block in the first bit block, a sum of an index of the starting symbol comprised in the first PDCCH occasion and a number of symbols comprised in the target symbol spacing is used to determine the first bit sub-block in the first bit block.

In one embodiment, when a starting symbol comprised in the first PDCCH occasion is used to determine the first bit sub-block in the first bit block, a sum of an index of the starting symbol comprised in the first PDCCH occasion and a number of symbols comprised in the target symbol spacing is used to determine an index of a PDSCH occasion to which the first signal belongs in time domain, the index of the PDSCH occasion to which the first signal belongs in time domain being used to determine the first bit sub-block in the first bit block.

In one embodiment, when a starting symbol comprised in the first PDCCH occasion is used to determine the first bit sub-block in the first bit block, a sum of an index of the starting symbol comprised in the first PDCCH occasion and a number of symbols comprised in the target symbol spacing is used to determine an index of a PDSCH occasion to which the first signal belongs in time domain, the index of the PDSCH occasion to which the first signal belongs in time domain being used to determine the first bit sub-block in the first bit block according to a determining Pseudo-Code of a Type-1 HARQ-ACK Codebook.

In one embodiment, the statement that "the number of symbols comprised in the target symbol spacing is used to determine the first bit sub-block in the first bit block" in the claims includes the following meaning: the number of symbols comprised in the target symbol spacing is used by the first node in the present application for determining the first bit sub-block in the first bit block.

In one embodiment, the statement that "the number of symbols comprised in the target symbol spacing is used to determine the first bit sub-block in the first bit block" in the claims includes the following meaning: the number of symbols comprised in the target symbol spacing is used to determine an index of a PDSCH occasion to which the first signal belongs in time domain, where the index of the PDSCH occasion to which the first signal belongs in time domain is used to determine the first bit sub-block in the first bit block.

In one embodiment, the statement that "the number of symbols comprised in the target symbol spacing is used to determine the first bit sub-block in the first bit block" in the claims includes the following meaning: the number of symbols comprised in the target symbol spacing is used to determine an index of a PDSCH occasion to which the first signal belongs in time domain, where the index of the PDSCH occasion to which the first signal belongs in time domain is used to determine the first bit sub-block in the first bit block according to a determining Pseudo-Code of a Type-1 HARQ-ACK Codebook.

Embodiment 7

Figure 7:
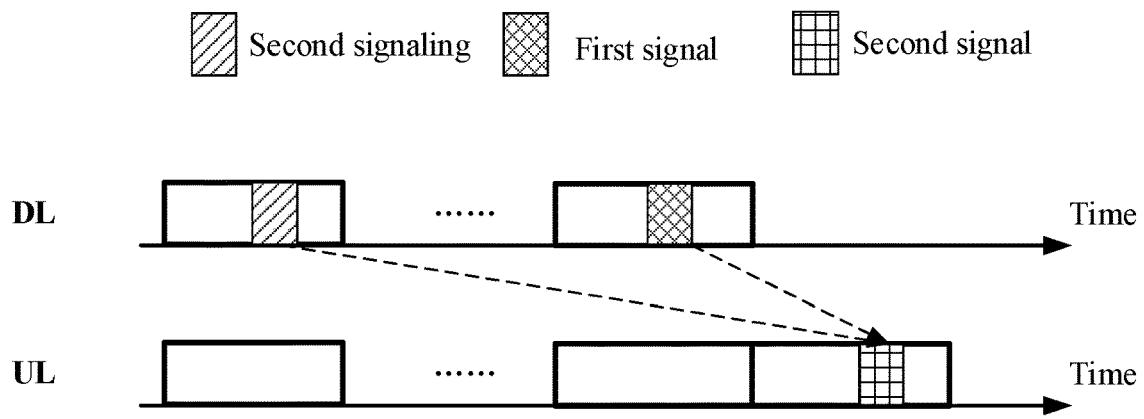
FIG. 7 illustrates a schematic diagram of a second signaling according to one embodiment of the present application.

Embodiment 7 illustrates a schematic diagram of a second signaling according to one embodiment of the present application, as shown in FIG. 7. In FIG. 7, the horizontal axis represents time, the upper of the figure indicates downlink transmission and the lower indicates uplink transmission, the slash-filled rectangle represents a second signaling, and the cross-filled rectangle represents a first signal, and the reticle-filled rectangle represents a second signal.

In Embodiment 7, a PDCCH candidate occupied by the second signaling in the present application is different from a PDCCH candidate occupied by the first signaling in the present application; the second signaling carries a target indication, the second signaling belonging to the second PDCCH occasion in the present application in time domain; the second PDCCH occasion belongs to X2 PDCCH occasions, X2 being a positive integer greater than 1; the X2 PDCCH occasions are indexed in order, and the target indication is used together with an index of the second PDCCH occasion among the X2 PDCCH occasions for determining the first bit sub-block of the present application in the first bit block of the present application.

In one embodiment, the second signaling is transmitted via an air interface.

In one embodiment, the second signaling is transmitted via a radio interface.

In one embodiment, the second signaling is transmitted via a Uu interface.

In one embodiment, the second signaling is transmitted via a PC5 interface.

In one embodiment, a transmitter transmitting the second signaling includes the second node in the present application.

In one embodiment, the second signaling comprises physical-layer information.

In one embodiment, the second signaling is received before the first signaling.

In one embodiment, the second signaling is received after the first signaling.

In one embodiment, the second signaling is transmitted through a Physical Downlink Control Channel (PDCCH).

In one embodiment, the second signaling carries all or partial fields in a Downlink Control Information (DCI) Format.

In one embodiment, the second signaling carries all or partial fields in one of DCI Formats 1-0, 1-1, or 1-2.

In one embodiment, the first signaling occupies a PDCCH Candidate.

In one embodiment, the second signaling occupies a PDCCH Candidate.

In one embodiment, a transmitter transmitting the first signaling and a transmitter transmitting the second signaling are respectively two different Transmit Reception Points (TRPs) of the second node.

In one embodiment, a transmitter transmitting the first signaling and a transmitter transmitting the second signaling are respectively two different antenna ports of the second node.

In one embodiment, a transmitter transmitting the first signaling and a transmitter transmitting the second signaling are respectively a first TRP and a second TRP, where there does not exist an Ideal Backhaul between the first TRP and the second TRP.

In one embodiment, a transmitter transmitting the first signaling and a transmitter transmitting the second signaling are respectively a first TRP and a second TRP, where there exists an Ideal Backhaul between the first TRP and the second TRP.

In one embodiment, a PDCCH candidate occupied by the first signaling and a PDCCH candidate occupied by the second signaling have different characteristics, the characteristics including at least one of a Control Resource Set (CORESET) to which the PDCCH candidate belongs, CCE(s) being occupied, a Scrambling being used, or a corresponding DCI Payload Size.

In one embodiment, the target indication is a Downlink Assignment Index (DAI).

In one embodiment, the target indication is a non-negative integer.

In one embodiment, the target indication is a counter.

In one embodiment, the target indication is a Counter Downlink Assignment Index (C-DAI).

In one embodiment, the target indication is a Total Downlink Assignment Index (T-DAI).

In one embodiment, the target indication is a positive integer.

In one embodiment, one or multiple fields comprised in the second signaling comprises/comprise the target indication.

In one embodiment, the second signaling is detected in the second PDCCH occasion.

In one embodiment, the second signaling occupies time-domain resources comprised by the second PDCCH occasion in time domain.

In one embodiment, the second signaling is received in the second PDCCH occasion.

In one embodiment, the X2 PDCCH occasions are potentially X2 PDCCHs corresponding to a same HARQ-ACK codebook.

In one embodiment, HARQ-ACKs corresponding to PDSCHs scheduled by or SPS PDSCHs indicated by PDCCHs comprised in the X2 PDCCH occasions potentially belong to a same HARQ-ACK codebook.

In one embodiment, HARQ-ACK bits corresponding respectively to the X2 PDCCH occasions potentially belong to a same HARQ-ACK codebook.

In one embodiment, any two PDCCH occasions of the X2 PDCCH occasions are different.

In one embodiment, the X2 PDCCH occasions are indexed in a chronological order.

In one embodiment, the X2 PDCCH occasions are indexed from early to late in time.

In one embodiment, the X2 PDCCH occasions are indexed from late to early in time.

In one embodiment, the X2 PDCCH occasions are indexed in a chronological order of start times of respectively linked search space sets.

In one embodiment, the X2 PDCCH occasions are indexed in an ascending order of start times of respectively linked search space sets.

In one embodiment, the statement in the claims that "the target indication is used together with an index of the second PDCCH occasion among the X2 PDCCH occasions for determining the first bit sub-block in the first bit block" includes the following meaning: the target indication and an index of the second PDCCH occasion among the X2 PDCCH occasions are used together by the first node in the present application to determine the first bit sub-block in the first bit block.

In one embodiment, the statement in the claims that "the target indication is used together with an index of the second PDCCH occasion among the X2 PDCCH occasions for determining the first bit sub-block in the first bit block" includes the following meaning: the target indication and an index of the second PDCCH occasion among the X2 PDCCH occasions are used to determine the first bit sub-block in the first bit block according to a determining rule of a Type-2 HARQ-ACK Codebook.

In one embodiment, the statement in the claims that "the target indication is used together with an index of the second PDCCH occasion among the X2 PDCCH occasions for determining the first bit sub-block in the first bit block" includes the following meaning: the target indication and an index of the second PDCCH occasion among the X2 PDCCH occasions are used to determine the first bit sub-block in the first bit block according to a determining Pseudo-Code of a Type-2 HARQ-ACK Codebook.

In one embodiment, the statement in the claims that "the target indication is used together with an index of the second PDCCH occasion among the X2 PDCCH occasions for determining the first bit sub-block in the first bit block" includes the following meaning: the target indication and an index of the second PDCCH occasion among the X2 PDCCH occasions are used to determine a position of the first bit sub-block in the first bit block according to a determining Pseudo-Code of a Type-2 HARQ-ACK Codebook.

In one embodiment, the first signaling also carries the target indication.

In one embodiment, the first node in the present application assumes that the first signaling and the second signaling both carry the target indication.

In one embodiment, DAI values carried by the first signaling and the second signaling are unequal.

In one embodiment, the first node in the present application assumes that DAI values carried by the first signaling and the second signaling are equal.

In one embodiment, the first node in the present application does not expect that DAI values carried by the first signaling and the second signaling are unequal.

Embodiment 8

Figure 8:
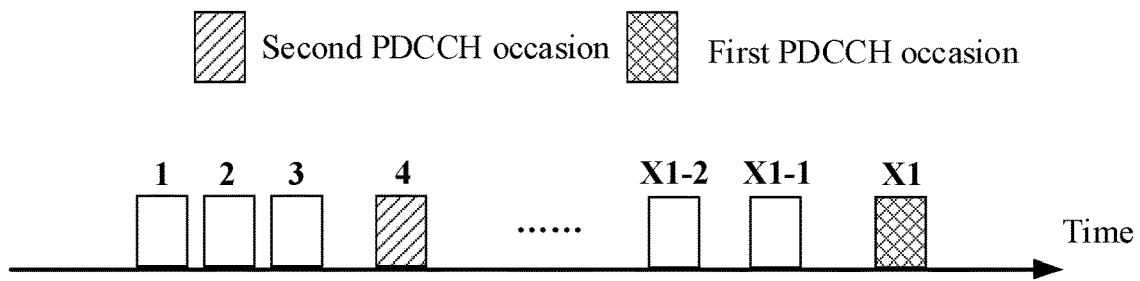
FIG. 8 illustrates a schematic diagram of a first PDCCH occasion and a second PDCCH occasion according to one embodiment of the present application.

Embodiment 8 illustrates a schematic diagram of a first PDCCH occasion and a second PDCCH occasion according to one embodiment of the present application, as shown in FIG. 8. In FIG. 8, the horizontal axis represents time, the slash-filled rectangle represents a second PDCCH occasion, and the cross-filled rectangle represents a first PDCCH occasion.

In Embodiment 8, a position of the first PDCCH occasion of the present application among the X1 PDCCH occasions of the present application is pre-defined, or a position of the first PDCCH occasion among the X1 PDCCH occasions is configurable; a position of the second PDCCH occasion of the present application among the X1 PDCCH occasions is pre-defined, or a position of the second PDCCH occasion among the X1 PDCCH occasions is configurable.

In one embodiment, the statement in the claims of "a position of the first PDCCH occasion among the X1 PDCCH occasions is pre-defined" includes a meaning that: an order of the first PDCCH occasion among the X1 PDCCH occasions is pre-defined.

In one embodiment, the statement in the claims of "a position of the first PDCCH occasion among the X1 PDCCH occasions is pre-defined" includes a meaning that: given the X1 PDCCH occasions, a position of the first PDCCH occasion among the X1 PDCCH occasions is fixed.

In one embodiment, the statement in the claims of "a position of the first PDCCH occasion among the X1 PDCCH occasions is pre-defined" includes a meaning that: the first PDCCH occasion is an earliest PDCCH occasion among the X1 PDCCH occasions.

In one embodiment, the statement in the claims of "a position of the first PDCCH occasion among the X1 PDCCH occasions is pre-defined" includes a meaning that: the first PDCCH occasion is a latest PDCCH occasion among the X1 PDCCH occasions.

In one embodiment, the statement in the claims of "a position of the first PDCCH occasion among the X1 PDCCH occasions is pre-defined" includes a meaning that: the first PDCCH occasion is a PDCCH occasion having an earliest start time among the X1 PDCCH occasions.

In one embodiment, the statement in the claims of "a position of the first PDCCH occasion among the X1 PDCCH occasions is pre-defined" includes a meaning that: the first PDCCH occasion is a PDCCH occasion having a latest start time among the X1 PDCCH occasions.

In one embodiment, the statement in the claims of "a position of the first PDCCH occasion among the X1 PDCCH occasions is pre-defined" includes a meaning that: the first PDCCH occasion is a PDCCH occasion having a latest end time among the X1 PDCCH occasions.

In one embodiment, the statement in the claims of "a position of the first PDCCH occasion among the X1 PDCCH occasions is configurable" includes a meaning that: the position of the first PDCCH occasion among the X1 PDCCH occasions is configured by one or more fields comprised in the first information block in the present application.

In one embodiment, the statement in the claims of "a position of the first PDCCH occasion among the X1 PDCCH occasions is configurable" includes a meaning that: the position of the first PDCCH occasion among the X1 PDCCH occasions is explicitly indicated by one or more fields comprised in the first information block in the present application.

In one embodiment, the statement in the claims of "a position of the first PDCCH occasion among the X1 PDCCH occasions is configurable" includes a meaning that: the position of the first PDCCH occasion among the X1 PDCCH occasions is implicitly indicated by one or more fields comprised in the first information block in the present application.

In one embodiment, the statement in the claims of "a position of the first PDCCH occasion among the X1 PDCCH occasions is configurable" includes a meaning that: the position of the first PDCCH occasion among the X1 PDCCH occasions is configured by an information block other than the first information block in the present application.

In one embodiment, the statement in the claims of "a position of the second PDCCH occasion among the X1

PDCCH occasions is pre-defined" includes a meaning that: an order of the second PDCCH occasion among the X1 PDCCH occasions is pre-defined.

In one embodiment, the statement in the claims of "a position of the second PDCCH occasion among the X1 PDCCH occasions is pre-defined" includes a meaning that: given the X1 PDCCH occasions, a position of the second PDCCH occasion among the X1 PDCCH occasions is fixed.

In one embodiment, the statement in the claims of "a position of the second PDCCH occasion among the X1 PDCCH occasions is pre-defined" includes a meaning that: the second PDCCH occasion is an earliest PDCCH occasion among the X1 PDCCH occasions.

In one embodiment, the statement in the claims of "a position of the second PDCCH occasion among the X1 PDCCH occasions is pre-defined" includes a meaning that: the second PDCCH occasion is a latest PDCCH occasion among the X1 PDCCH occasions.

In one embodiment, the statement in the claims of "a position of the second PDCCH occasion among the X1 PDCCH occasions is pre-defined" includes a meaning that: the second PDCCH occasion is a PDCCH occasion having an earliest start time among the X1 PDCCH occasions.

In one embodiment, the statement in the claims of "a position of the second PDCCH occasion among the X1 PDCCH occasions is pre-defined" includes a meaning that: the second PDCCH occasion is a PDCCH occasion having a latest start time among the X1 PDCCH occasions.

In one embodiment, the statement in the claims of "a position of the second PDCCH occasion among the X1 PDCCH occasions is pre-defined" includes a meaning that: the second PDCCH occasion is a PDCCH occasion having a latest end time among the X1 PDCCH occasions.

In one embodiment, the statement in the claims of "a position of the second PDCCH occasion among the X1 PDCCH occasions is configurable" includes a meaning that: the position of the second PDCCH occasion among the X1 PDCCH occasions is configured by one or more fields comprised in the first information block in the present application.

In one embodiment, the statement in the claims of "a position of the second PDCCH occasion among the X1 PDCCH occasions is configurable" includes a meaning that: the position of the second PDCCH occasion among the X1 PDCCH occasions is explicitly indicated by one or more fields comprised in the first information block in the present application.

In one embodiment, the statement in the claims of "a position of the second PDCCH occasion among the X1 PDCCH occasions is configurable" includes a meaning that: the position of the second PDCCH occasion among the X1 PDCCH occasions is implicitly indicated by one or more fields comprised in the first information block in the present application.

In one embodiment, the statement in the claims of "a position of the second PDCCH occasion among the X1 PDCCH occasions is configurable" includes a meaning that: the position of the second PDCCH occasion among the X1 PDCCH occasions is configured by an information block other than the first information block in the present application.

Embodiment 9

Figure 9:
FIG. 9 illustrates a schematic diagram of a relationship between a first PDCCH candidate and a second PDCCH candidate according to one embodiment of the present application.

Embodiment 9 illustrates a schematic diagram of a relationship between a first PDCCH candidate and a second PDCCH candidate according to one embodiment of the present application, as shown in FIG. 9. In FIG. 9, a first PDCCH candidate and a second PDCCH candidate are respectively transmitted from a TRP #1 and a TRP #2.

In Embodiment 9, a PDCCH candidate occupied by the first signaling in the present application is a first PDCCH candidate, and a second PDCCH candidate is a PDCCH candidate other than the first PDCCH candidate; a quasi co-location of a reference signal comprised in the first PDCCH candidate is different from a quasi co-location of a reference signal comprised in the second PDCCH candidate; the first PDCCH candidate and the second PDCCH candidate are linked.

In one embodiment, the first PDCCH candidate and the second PDCCH candidate respectively belong to two different PDCCH occasions among the X1 PDCCH occasions in time domain.

In one embodiment, the first PDCCH candidate and the second PDCCH candidate respectively belong to a same PDCCH occasion among the X1 PDCCH occasions in time domain.

In one embodiment, the first PDCCH candidate occupies a positive integer number of Control Channel Element(s) (CCE(s)) in time-frequency domain, while the second PDCCH candidate occupies a positive integer number of CCE(s) in time-frequency domain.

In one embodiment, the number of CCE(s) occupied by the first PDCCH candidate is equal to one of 1, 2, 4, 8 or 16, while the number of CCE(s) occupied by the second PDCCH candidate is equal to one of 1, 2, 4, 8 or 16.

In one embodiment, the first PDCCH candidate occupied by the first signaling carries the first signaling.

In one embodiment, the second PDCCH candidate carries a signaling other than the first signaling.

In one embodiment, the second PDCCH candidate does not carry DCI.

In one embodiment, the second PDCCH candidate carries the second signaling in the present application.

In one embodiment, the first signaling occupies time-frequency resources occupied by the first PDCCH candidate.

In one embodiment, the first signaling occupies CCE(s) comprised by the first PDCCH candidate.

In one embodiment, the first PDCCH candidate and the second PDCCH candidate are different.

In one embodiment, any CCE occupied by the first PDCCH candidate is different from any CCE occupied by the second PDCCH candidate.

In one embodiment, any CCE occupied by the first PDCCH candidate and any CCE occupied by the second PDCCH candidate are orthogonal.

In one embodiment, a CCE occupied by the first PDCCH candidate and a CCE occupied by the second PDCCH candidate are the same, where there exists one CCE being occupied by only one of the first PDCCH candidate or the second PDCCH candidate.

In one embodiment, the first PDCCH candidate and the second PDCCH candidate have different characteristics, the characteristics including at least one of CCE(s) being occupied, a Scrambling being used, or a corresponding DCI Payload Size.

In one embodiment, the first node in the present application assumes that the first PDCCH candidate and the second PDCCH candidate have different characteristics, the characteristics including at least one of CCE(s) being occupied, a Scrambling being used, or a corresponding DCI Payload Size.

In one embodiment, the first PDCCH candidate and the second PDCCH candidate belong to a same Search Space Set.

In one embodiment, the first PDCCH candidate and the second PDCCH candidate respectively belong to two different Search Space Sets.

In one embodiment, a Control Resource Set (CORESET) corresponding to a Search Space Set to which the first PDCCH candidate belongs and a CORESET corresponding to a Search Space Set to which the second PDCCH candidate belongs are identical.

In one embodiment, a Control Resource Set (CORESET) corresponding to a Search Space Set to which the first PDCCH candidate belongs is different from a CORESET corresponding to a Search Space Set to which the second PDCCH candidate belongs.

In one embodiment, an index of a Control Resource Set (CORESET) corresponding to a Search Space Set to which the first PDCCH candidate belongs and an index of a CORESET corresponding to a Search Space Set to which the second PDCCH candidate belongs are equal.

In one embodiment, an index of a Control Resource Set (CORESET) corresponding to a Search Space Set to which the first PDCCH candidate belongs and an index of a CORESET corresponding to a Search Space Set to which the second PDCCH candidate belongs are unequal.

In one embodiment, the number of CCE(s) occupied by the first PDCCH candidate and the number of CCE(s) occupied by the second PDCCH candidate are equal.

In one embodiment, the number of CCE(s) occupied by the first PDCCH candidate and the number of CCE(s) occupied by the second PDCCH candidate are unequal.

In one embodiment, an Aggregation Level (AL) of the first PDCCH candidate and an AL of the second PDCCH candidate are equal.

In one embodiment, an Aggregation Level (AL) of the first PDCCH candidate and an AL of the second PDCCH candidate are unequal.

In one embodiment, a reference signal comprised in the first PDCCH candidate and a reference signal comprised in the second PDCCH candidate are both Physical Downlink Control Channel (PDCCH) Demodulation Reference Signals (DMRS).

In one embodiment, a reference signal comprised in the first PDCCH candidate and a reference signal comprised in the second PDCCH candidate are both reference signals used for Physical Downlink Control Channel (PDCCH) reception.

In one embodiment, a reference signal comprised in the first PDCCH candidate and a reference signal comprised in the second PDCCH candidate are respectively Quasi Co-Located (QCL) with different reference signals.

In one embodiment, a reference signal comprised in the first PDCCH candidate and a reference signal comprised in the second PDCCH candidate are respectively Quasi Co-Located (QCL) with different antenna ports.

In one embodiment, a reference signal comprised in the first PDCCH candidate and a reference signal comprised in the second PDCCH candidate are respectively Quasi Co-Located (QCL) with reference signals occupying different time-frequency resources.

In one embodiment, a reference signal comprised in the first PDCCH candidate and a reference signal comprised in the second PDCCH candidate are respectively Quasi Co-Located (QCL) with reference signals occupying different time-domain resources.

In one embodiment, a reference signal comprised in the first PDCCH candidate and a reference signal comprised in the second PDCCH candidate are respectively Quasi Co-Located (QCL) with Synchronization Signal/Physical Broadcast Channel (SS/PBCH) Blocks having unequal indexes.

In one embodiment, a reference signal comprised in the first PDCCH candidate and a reference signal comprised in the second PDCCH candidate are respectively Quasi Co-Located (QCL) with Channel Status Information Reference Signals (CSI-RS) of different antenna ports.

In one embodiment, a reference signal comprised in the first PDCCH candidate and a reference signal comprised in the second PDCCH candidate are respectively Quasi Co-Located (QCL) with Channel Status Information Reference Signals (CSI-RS) occupying different time-frequency resources.

In one embodiment, the first node in the present application assumes that Quasi Co-Location (QCL) of a reference signal comprised in the first PDCCH candidate is different from QCL of a reference signal comprised in the second PDCCH candidate.

In one embodiment, the first node in the present application cannot assume that Quasi Co-Location (QCL) of a reference signal comprised in the first PDCCH candidate is identical to QCL of a reference signal comprised in the second PDCCH candidate.

In one embodiment, a Transmission Configuration Indication (TCI) State of a reference signal comprised in the first PDCCH candidate is different from a TCI State of a reference signal comprised in the second PDCCH candidate.

In one embodiment, an antenna port quasi co-location of a reference signal comprised in the first PDCCH candidate is different from an antenna port quasi co-location of a reference signal comprised in the second PDCCH candidate.

In one embodiment, a QCL type of a reference signal comprised in the first PDCCH candidate is different from a QCL type of a reference signal comprised in the second PDCCH candidate.

In one embodiment, a QCL type of a reference signal comprised in the first PDCCH candidate and a QCL type of a reference signal comprised in the second PDCCH candidate are identical.

In one embodiment, the first receiver receives a fifth information block, where the fifth information block is used to determine a target quasi co-location set, the target quasi co-location set comprising more than one antenna port quasi co-location; quasi co-location of a reference signal comprised in the first PDCCH candidate is an antenna port quasi co-location comprised in the target quasi co-location set, and quasi co-location of a reference signal comprised in the second PDCCH candidate is an antenna port quasi co-location comprised in the target quasi co-location set.

In one embodiment, the statement in the claims that "the first PDCCH candidate and the second PDCCH candidate are linked" includes a meaning that: the first node in the present application assumes that the first PDCCH candidate and the second PDCCH candidate are linked.

In one embodiment, the statement in the claims that "the first PDCCH candidate and the second PDCCH candidate are linked" includes a meaning that: Soft Combining between the first PDCCH candidate and the second PDCCH candidate is supported.

In one embodiment, the statement in the claims that "the first PDCCH candidate and the second PDCCH candidate are linked" includes a meaning that: a DCI Payload carried by the first PDCCH candidate and a DCI Payload carried by the second PDCCH candidate are identical.

In one embodiment, the statement in the claims that "the first PDCCH candidate and the second PDCCH candidate are linked" refers to claim 6 in the present application.

In one embodiment, the statement in the claims that "the first PDCCH candidate and the second PDCCH candidate are linked" includes a meaning that: a DCI carried by the first PDCCH candidate and a DCI carried by the second PDCCH candidate are used for scheduling a same signal or channel.

In one embodiment, the statement in the claims that "the first PDCCH candidate and the second PDCCH candidate are linked" includes a meaning that: a DCI carried by the second PDCCH candidate is also used for scheduling the first signal.

In one embodiment, the statement in the claims that "the first PDCCH candidate and the second PDCCH candidate are linked" includes a meaning that: a DCI carried by the first PDCCH candidate and a DCI carried by the second PDCCH candidate are used for scheduling a same Transport Block (TB).

In one embodiment, the statement in the claims that "the first PDCCH candidate and the second PDCCH candidate are linked" includes a meaning that: a DCI carried by the first PDCCH candidate and a DCI carried by the second PDCCH candidate are two repetitions of a same DCI.

In one embodiment, the statement in the claims that "the first PDCCH candidate and the second PDCCH candidate are linked" includes a meaning that: the first PDCCH candidate and the second PDCCH candidate are two transmissions among Multi-Chance transmissions of scheduling information of a same Transport Block (TB).

In one embodiment, the statement in the claims that "the first PDCCH candidate and the second PDCCH candidate are linked" includes a meaning that: an index of the first PDCCH candidate and an index of the second PDCCH candidate are mutually linked/associated.

In one embodiment, the statement in the claims that "the first PDCCH candidate and the second PDCCH candidate are linked" includes a meaning that: there is a relation of mapping between an index of the first PDCCH candidate and an index of the second PDCCH candidate.

In one embodiment, the statement in the claims that "the first PDCCH candidate and the second PDCCH candidate are linked" includes a meaning that: there is a relation of function between an index of the first PDCCH candidate and an index of the second PDCCH candidate.

In one embodiment, the statement in the claims that "the first PDCCH candidate and the second PDCCH candidate are linked" includes a meaning that: CCE(s) comprised in the first PDCCH candidate and CCE(s) comprised in the second PDCCH candidate are mutually linked/associated.

In one embodiment, a linkage type of the first PDCCH candidate and the second PDCCH candidate being mutually linked is used to determine whether the second PDCCH candidate is counted for a number of times of monitoring of the first node.

In one embodiment, the second PDCCH candidate is counted for a number of times of monitoring of the first node.

In one embodiment, the second PDCCH candidate is counted once for a number of times of monitoring of the first node.

In one embodiment, the second PDCCH candidate is counted twice for a number of times of monitoring of the first node.

In one embodiment, the second PDCCH candidate is not counted for a number of times of monitoring of the first node.

In one embodiment, one or more fields comprised in the first information block is(are) used for indicating that the first PDCCH candidate and the second PDCCH candidate are mutually linked.

In one embodiment, one or more fields comprised in an information block other than the first information block is(are) used for indicating that the first PDCCH candidate and the second PDCCH candidate are mutually linked.

Embodiment 10

Figure 10:
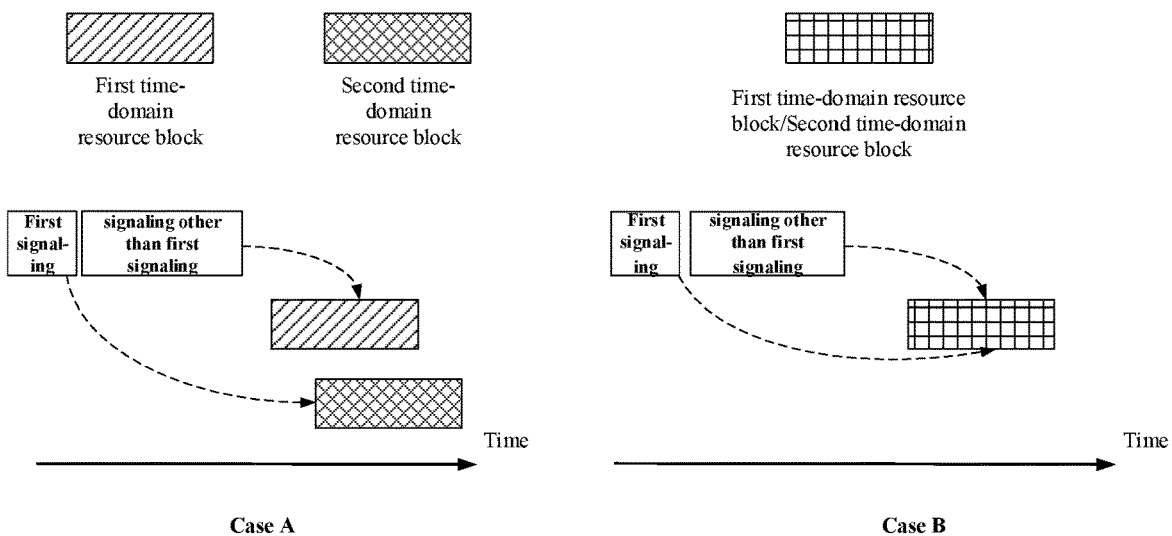
FIG. 10 illustrates a schematic diagram of a relationship between a first time-domain resource block and a second time-domain resource block according to one embodiment of the present application.

Embodiment 10 illustrates a schematic diagram of a relationship between a first time-domain resource block and a second time-domain resource block according to one embodiment of the present application, as shown in FIG. 10. In FIG. 10, as shown in Case A and Case B, the horizontal axis represents time; in Case A, a first time-domain resource block and a second time-domain resource block are not totally overlapping—the slash-filled rectangle represents a first time-domain resource block, while the cross-filled rectangle represents a second time-domain resource block; In Case B, a first time-domain resource block and a second time-domain resource block are totally overlapping—the reticle-filled rectangle represents a first time-domain resource block and a second time-domain resource block.

In Embodiment 10, the first signal in the present application occupies a first time-domain resource block in time domain, while a signaling carried by a PDCCH candidate other than a PDCCH candidate occupied by the first signaling in the present application is used to indicate a second time-domain resource block, there existing overlapping time-domain resources between the first time-domain resource block and the second time-domain resource block.

In one embodiment, one or multiple fields comprised in the first signaling is(are) used to determine the first time-domain resource block.

In one embodiment, one or multiple fields comprised in the first signaling is(are) used to indicate the first time-domain resource block.

In one embodiment, an identical field in the first signaling is used to determine the first frequency-domain resource set and the first time-domain resource block.

In one embodiment, two different fields in the first signaling are respectively used to determine the first frequency-domain resource set and the first time-domain resource block.

In one embodiment, the first information block is used to determine the first time-domain resource block.

In one embodiment, an information block other than the first information block is used to determine the first time-domain resource block.

In one embodiment, the first time-domain resource block comprises consecutive time-domain resources.

In one embodiment, the first time-domain resource block comprises consecutive time-domain symbols.

In one embodiment, the first time-domain resource block comprises a positive integer number of time-domain symbol(s).

In one embodiment, the first time-domain resource block comprises more than one time-domain symbol.

In one embodiment, the first time-domain resource block comprises consecutive time-domain symbols.

In one embodiment, the first time-domain resource block comprises only one time-domain symbol.

In one embodiment, the second time-domain resource block comprises consecutive time-domain resources.

In one embodiment, the second time-domain resource block comprises consecutive time-domain symbols.

In one embodiment, the second time-domain resource block comprises a positive integer number of time-domain symbol(s).

In one embodiment, the second time-domain resource block comprises more than one time-domain symbol.

In one embodiment, the second time-domain resource block comprises discrete time-domain symbols.

In one embodiment, the second time-domain resource block comprises only one time-domain symbol.

In one embodiment, the first time-domain resource block and the second time-domain resource block are identical.

In one embodiment, the second time-domain resource block is the first time-domain resource block.

In one embodiment, the first time-domain resource block and the second time-domain resource block are different.

In one embodiment, the statement of "a PDCCH candidate other than a PDCCH candidate occupied by the first signaling" in the claims refers to the second PDCCH candidate in the present application.

In one embodiment, the statement of "a PDCCH candidate other than a PDCCH candidate occupied by the first signaling" in the claims refers to a PDCCH candidate occupied by the second signaling in the present application.

In one embodiment, the statement of "a PDCCH candidate other than a PDCCH candidate occupied by the first signaling" in the claims refers to a PDCCH candidate different from a PDCCH candidate occupied by the first signaling in the present application.

In one embodiment, the statement of "a PDCCH candidate other than a PDCCH candidate occupied by the first signaling" in the claims refers to a PDCCH candidate different from the first PDCCH candidate in the present application.

In one embodiment, the statement in the claims that "a signaling carried by a PDCCH candidate other than a PDCCH candidate occupied by the first signaling is used to indicate a second time-domain resource block" includes the following meaning: the second signaling in the present application is used to indicate the second time-domain resource block.

In one embodiment, the statement in the claims that "a signaling carried by a PDCCH candidate other than a PDCCH candidate occupied by the first signaling is used to indicate a second time-domain resource block" includes the following meaning: a signaling carried by the second PDCCH candidate in the present application is used to indicate the second time-domain resource block.

In one embodiment, the statement in the claims that "a signaling carried by a PDCCH candidate other than a PDCCH candidate occupied by the first signaling is used to indicate a second time-domain resource block" includes the following meaning: a signaling carried by a PDCCH candidate other than a PDCCH candidate occupied by the first signaling is used for explicitly indicating the second time-domain resource block.

In one embodiment, the statement in the claims that "a signaling carried by a PDCCH candidate other than a PDCCH candidate occupied by the first signaling is used to indicate a second time-domain resource block" includes the following meaning: a signaling carried by a PDCCH candidate other than a PDCCH candidate occupied by the first signaling is used for implicitly indicating the second time-domain resource block.

In one embodiment, the statement in the claims that "a signaling carried by a PDCCH candidate other than a PDCCH candidate occupied by the first signaling is used to indicate a second time-domain resource block" includes the following meaning: a signaling carried by a PDCCH candidate other than a PDCCH candidate occupied by the first signaling is used for scheduling the second time-domain resource block.

In one embodiment, the statement in the claims that "a signaling carried by a PDCCH candidate other than a PDCCH candidate occupied by the first signaling" includes all or partial fields in a DCI.

In one embodiment, the statement in the claims that "a signaling carried by a PDCCH candidate other than a PDCCH candidate occupied by the first signaling" includes all or partial fields in a DCI using a DCI format.

In one embodiment, the statement in the claims that "there existing overlapping time-domain resources between the first time-domain resource block and the second time-domain resource block" includes the following meaning: the first node assumes that there exist overlapping time-domain resources between the first time-domain resource block and the second time-domain resource block In one embodiment, the statement in the claims that "there existing overlapping time-domain resources between the first time-domain resource block and the second time-domain resource block" includes the following meaning: there exists one time-domain symbol that belongs to both the first time-domain resource block and the second time-domain resource block in time domain.

In one embodiment, the statement in the claims that "there existing overlapping time-domain resources between the first time-domain resource block and the second time-domain resource block" includes the following meaning: the first time-domain resource block and the second time-domain resource block are totally identical.

In one embodiment, the statement in the claims that "there existing overlapping time-domain resources between the first time-domain resource block and the second time-domain resource block" includes the following meaning: the first time-domain resource block and the second time-domain resource block are Partially Overlapped in time domain.

In one embodiment, the statement in the claims that "there existing overlapping time-domain resources between the first time-domain resource block and the second time-domain resource block" includes the following meaning: the first time-domain resource block and the second time-domain resource block are Fully Overlapped in time domain.

In one embodiment, a signaling carried by a PDCCH candidate other than a PDCCH candidate occupied by the first signaling is used for indicating the first frequency-domain resource set.

Embodiment 11

Figure 11:
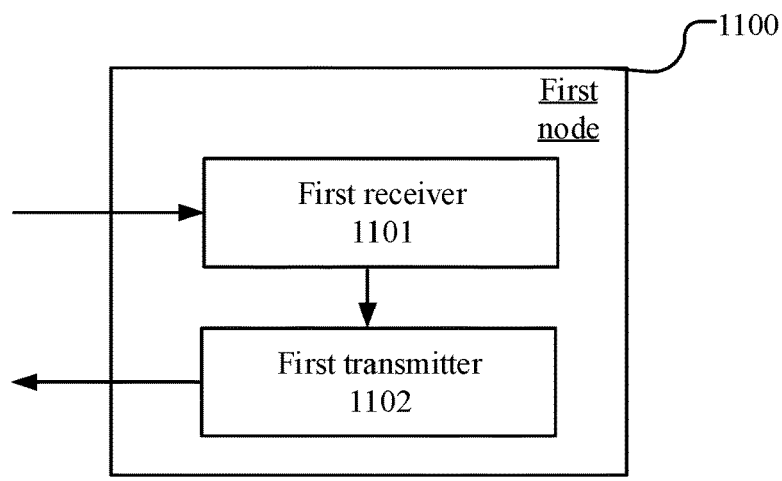
FIG. 11 illustrates a structure block diagram of a processing device in a first node according to one embodiment of the present application.

Embodiment 11 illustrates a structure block diagram of a processing device in a first node in an example, as shown in FIG. 11. In FIG. 11, a processing device 1100 in the first node comprises a first receiver 1101 and a first transmitter 1102. The first receiver 1101 comprises the transmitter/receiver 456 (comprising the antenna 460), the receiving processor 452 and the controller/processor 490 in FIG. 4 of the present application; the first transmitter 1102 comprises the transmitter/receiver 456 (comprising the antenna 460) and the transmitting processor 455 in FIG. 4 of the present application.

In Embodiment 11, the first receiver 1101 receives a first information block, the first information block being used to determine X1 PDCCH occasions, where X1 is a positive integer greater than 1; the first receiver 1101 receives a first signaling and receiving a first signal, the first signal occupying a first frequency-domain resource set in frequency domain, and the first signaling being used to determine the first frequency-domain resource set; and the first transmitter 1102 transmits a second signal, the second signal carrying a first bit block, the first bit block comprising at least one bit; herein, the first signaling is used to determine a first time interval length, the first time interval length being used to determine a length of a time interval in time domain between a first PDCCH occasion and the first signal, the first PDCCH occasion being one of the X1 PDCCH occasions; the first bit block comprises a first bit sub-block, the first bit sub-block comprising at least one bit; a position of the first signal in time domain is used to determine a position of the second signal in time domain, whether the first signal is correctly received being used to determine a bit value of the first bit sub-block; a second PDCCH occasion is used to determine the first bit sub-block in the first bit block, where the second PDCCH occasion is one of the X1 PDCCH occasions.

In one embodiment, the first signaling is used to determine a target symbol spacing, the target symbol spacing being used to determine a starting symbol occupied by the first signal in time domain, and a number of symbols comprised in the target symbol spacing being used to determine the first time interval length; whether the first PDCCH occasion and the first signal belong to a same slot is used to determine whether a starting symbol comprised in the first PDCCH occasion is used to determine the first bit sub-block in the first bit block, where the number of symbols comprised in the target symbol spacing is used to determine the first bit sub-block in the first bit block.

In one embodiment, the first receiver 1101 receives a second signaling; herein, a PDCCH candidate occupied by the second signaling is different from a PDCCH candidate occupied by the first signaling; the second signaling carries a target indication, the second signaling belonging to the second PDCCH occasion in time domain; the second PDCCH occasion belongs to X2 PDCCH occasions, X2 being a positive integer greater than 1; the X2 PDCCH occasions are indexed in order, and the target indication is used together with an index of the second PDCCH occasion among the X2 PDCCH occasions for determining the first bit sub-block in the first bit block.

In one embodiment, a position of the first PDCCH occasion among the X1 PDCCH occasions is pre-defined, or a position of the first PDCCH occasion among the X1 PDCCH occasions is configurable; a position of the first PDCCH occasion among the X1 PDCCH occasions is pre-defined, or a position of the second PDCCH occasion among the X1 PDCCH occasions is configurable.

In one embodiment, a PDCCH candidate occupied by the first signaling is a first PDCCH candidate, and a second PDCCH candidate is a PDCCH candidate other than the first PDCCH candidate; a quasi co-location of a reference signal comprised in the first PDCCH candidate is different from a quasi co-location of a reference signal comprised in the second PDCCH candidate; the first PDCCH candidate and the second PDCCH candidate are linked.

In one embodiment, the first signal occupies a first time-domain resource block in time domain, while a signaling carried by a PDCCH candidate other than a PDCCH candidate occupied by the first signaling is used to indicate a second time-domain resource block, there existing overlapping time-domain resources between the first time-domain resource block and the second time-domain resource block.

In one embodiment, the first transmitter 1102 transmits a second information block; herein, the second information block is used to indicate at least one of whether the first node supports PDCCH candidates being mutually linked or a linkage type between mutually linked PDCCH candidates supported by the first node.

Embodiment 12

Figure 12:
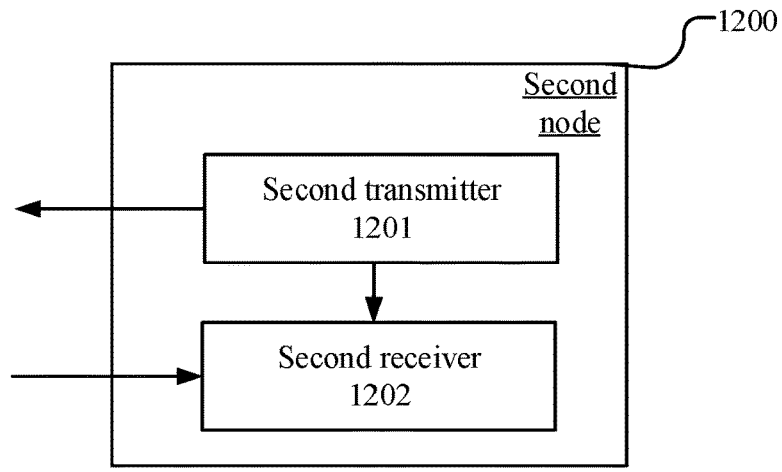
FIG. 12 illustrates a structure block diagram of a processing device in a second node according to one embodiment of the present application.

Embodiment 12 illustrates a structure block diagram of a processing device in a second node in an example, as shown in FIG. 12. In FIG. 12, a processing device 1200 in a second node comprises a second transmitter 1201 and a second receiver 1202. The second transmitter 1201 comprises the transmitter/receiver 416 (comprising the antenna 460), the transmitting processor 415 and the controller/processor 440 in FIG. 4 of the present application; the second receiver 1202 comprises the transmitter/receiver 416 (comprising the antenna 460) and the receiving processor 412 in FIG. 4 of the present application.

In Embodiment 12, the second transmitter 1201 transmits a first information block, the first information block being used to indicate X1 PDCCH occasions, where X1 is a positive integer greater than 1; the second transmitter 1201 transmits a first signaling and transmits a first signal, the first signal occupying a first frequency-domain resource set in frequency domain, and the first signaling being used to indicate the first frequency-domain resource set; and the second receiver 1202 receives a second signal, the second signal carrying a first bit block, the first bit block comprising at least one bit; herein, the first signaling is used to indicate a first time interval length, the first time interval length being used to determine a length of a time interval in time domain between a first PDCCH occasion and the first signal, the first PDCCH occasion being one of the X1 PDCCH occasions; the first bit block comprises a first bit sub-block, the first bit sub-block comprising at least one bit; a position of the first signal in time domain is used to determine a position of the second signal in time domain, whether the first signal is correctly received being used to determine a bit value of the first bit sub-block; a second PDCCH occasion is used to determine the first bit sub-block in the first bit block, where the second PDCCH occasion is one of the X1 PDCCH occasions.

In one embodiment, the first signaling is used to indicate a target symbol spacing, the target symbol spacing being used to determine a starting symbol occupied by the first signal in time domain, and a number of symbols comprised in the target symbol spacing being used to determine the first time interval length; whether the first PDCCH occasion and the first signal belong to a same slot is used to determine whether a starting symbol comprised in the first PDCCH occasion is used to determine the first bit sub-block in the first bit block, where the number of symbols comprised in the target symbol spacing is used to determine the first bit sub-block in the first bit block.

In one embodiment, the second transmitter 1201 transmits a second signaling; herein, a PDCCH candidate occupied by the second signaling is different from a PDCCH candidate occupied by the first signaling; the second signaling carries a target indication, the second signaling belonging to the second PDCCH occasion in time domain; the second PDCCH occasion belongs to X2 PDCCH occasions, X2 being a positive integer greater than 1; the X2 PDCCH occasions are indexed in order, and the target indication is used together with an index of the second PDCCH occasion among the X2 PDCCH occasions for determining the first bit sub-block in the first bit block.

In one embodiment, a position of the first PDCCH occasion among the X1 PDCCH occasions is pre-defined, or a position of the first PDCCH occasion among the X1 PDCCH occasions is configurable; a position of the first PDCCH occasion among the X1 PDCCH occasions is pre-defined, or a position of the second PDCCH occasion among the X1 PDCCH occasions is configurable.

In one embodiment, a PDCCH candidate occupied by the first signaling is a first PDCCH candidate, and a second PDCCH candidate is a PDCCH candidate other than the first PDCCH candidate; a quasi co-location of a reference signal comprised in the first PDCCH candidate is different from a quasi co-location of a reference signal comprised in the second PDCCH candidate; the first PDCCH candidate and the second PDCCH candidate are linked.

In one embodiment, the first signal occupies a first time-domain resource block in time domain, while a signaling carried by a PDCCH candidate other than a PDCCH candidate occupied by the first signaling is used to indicate a second time-domain resource block, there existing overlapping time-domain resources between the first time-domain resource block and the second time-domain resource block.

In one embodiment, the second receiver 1202 receives a second information block; herein, the second information block is used to indicate at least one of whether the first node supports PDCCH candidates being mutually linked or a linkage type between mutually linked PDCCH candidates supported by the first node.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The first node or the second node, or UE or terminal includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, test equipment or test instrument, and other radio communication equipment, etc. The base station in the present application includes but is not limited to macro-cellular base stations, micro-cellular base stations, home base stations, relay base station, eNB, gNB, Transmitter Receiver Point (TRP), relay satellite, satellite base station, airborne base station, test apparatus, test equipment or test instrument, and other radio communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A user equipment (UE) for wireless communications, comprising:
   a receiver, receiving a first information block, the first information block being used to determine a first plurality of PDCCH occasions;
   the receiver, receiving a first signaling and receiving a first signal, the first signal occupying a frequency-domain resource set in frequency domain, and the first signaling being used to determine the frequency-domain resource set; and
   a transmitter, transmitting a second signal, the second signal carrying a bit block, the bit block comprising at least one bit;
   wherein the first signaling is used to determine a first time interval length, the first time interval length being used to determine a length of a time interval in time domain between a first PDCCH occasion and the first signal, the first PDCCH occasion being a PDCCH occasion having a latest end time among the first plurality of PDCCH occasions; the bit block comprises a bit sub-block, the bit sub-block comprising at least one bit; a position of the first signal in time domain is used to determine a position of the second signal in time domain, whether the first signal is correctly received being used to determine a bit value of the bit sub-block; a second PDCCH occasion is used to determine the bit sub-block in the bit block, wherein the second PDCCH occasion is a PDCCH occasion having an earliest start time among the first plurality of PDCCH occasions.

2. The UE according to claim 1, wherein the first signaling is used to determine a target symbol interval, the target symbol interval being used to determine a starting symbol occupied by the first signal in time domain, and a number of symbols in the target symbol interval being used to determine the first time interval length; whether the first PDCCH occasion and the first signal belong to a same slot is used to determine whether a starting symbol in the first PDCCH occasion is used to determine the bit sub-block in the bit block, wherein the number of symbols in the target symbol interval is used to determine the bit sub-block in the bit block.

3. The UE according to claim 1, wherein the receiver receives a second signaling; wherein a PDCCH candidate occupied by the second signaling is different from a PDCCH candidate occupied by the first signaling; the second signaling carries a target indication, the second signaling belonging to the second PDCCH occasion in time domain; the second PDCCH occasion belongs to a second plurality of PDCCH occasions; the second plurality of PDCCH occasions are indexed in order, and the target indication is used together with an index of the second PDCCH occasion among the second plurality of PDCCH occasions for determining the bit sub-block in the bit block.

4. The UE according to claim 1, wherein the first time interval length is expressed in a number of slots corresponding to a target subcarrier spacing, and the first time interval length is used to determine a length of a time interval in time domain between a slot to which the first PDCCH occasion belongs and a slot to which the first signal belongs; or, the first time interval length is expressed in a number of symbols corresponding to the target subcarrier spacing, and the first time interval length is used to determine a length of a time interval in time domain between a starting symbol in the first PDCCH occasion and a starting symbol occupied by the first signal; the target subcarrier spacing is equal to one of a subcarrier spacing used by the first signaling or a subcarrier spacing used by the first signal.

5. The UE according to claim 1, wherein a PDCCH candidate occupied by the first signaling is a first PDCCH candidate, and a second PDCCH candidate is a PDCCH candidate other than the first PDCCH candidate; a quasi co-location of a reference signal comprised in the first PDCCH candidate is different from a quasi co-location of a reference signal comprised in the second PDCCH candidate; and wherein the first PDCCH candidate and the second PDCCH candidate are linked.

6. The UE according to claim 1, wherein the first signal occupies a first time-domain resource block in time domain, while a signaling carried by a PDCCH candidate other than a PDCCH candidate occupied by the first signaling is used to indicate a second time-domain resource block, wherein overlapping time-domain resources exist between the first time-domain resource block and the second time-domain resource block.

7. The UE according to claim 1, wherein the transmitter transmits a second information block; wherein the second information block is used to indicate at least one of whether the UE supports PDCCH candidates being mutually linked or a linkage type between mutually linked PDCCH candidates supported by the UE.

8. A base station for wireless communications, comprising:
   a transmitter, transmitting a first information block, the first information block being used to indicate a first plurality of PDCCH occasions;
   the transmitter, transmitting a first signaling and transmitting a first signal, the first signal occupying a frequency-domain resource set in frequency domain, and the first signaling being used to indicate the frequency-domain resource set; and
   a receiver, receiving a second signal, the second signal carrying a bit block, the bit block comprising at least one bit;
   wherein the first signaling is used to indicate a first time interval length, the first time interval length being used to determine a length of a time interval in time domain between a first PDCCH occasion and the first signal, the first PDCCH occasion being a PDCCH occasion having a latest end time among the first plurality of PDCCH occasions; the bit block comprises a bit sub-block, the bit sub-block comprising at least one bit; a position of the first signal in time domain is used to determine a position of the second signal in time domain, whether the first signal is correctly received being used to determine a bit value of the bit sub-block; a second PDCCH occasion is used to determine the bit sub-block in the bit block, wherein the second PDCCH occasion is a PDCCH occasion having an earliest start time among the first plurality of PDCCH occasions.

9. The base station according to claim 8, wherein the first signaling is used to determine a target symbol interval, the target symbol interval being used to determine a starting symbol occupied by the first signal in time domain, and a number of symbols in the target symbol interval being used to determine the first time interval length; whether the first PDCCH occasion and the first signal belong to a same slot is used to determine whether a starting symbol in the first PDCCH occasion is used to determine the bit sub-block in the bit block, wherein the number of symbols in the target symbol interval is used to determine the bit sub-block in the bit block.

10. The base station according to claim 8, wherein the transmitter transmits a second signaling; wherein a PDCCH candidate occupied by the second signaling is different from a PDCCH candidate occupied by the first signaling; the second signaling carries a target indication, the second signaling belonging to the second PDCCH occasion in time domain; the second PDCCH occasion belongs to a second plurality of PDCCH occasions; the second plurality of PDCCH occasions are indexed in order, and the target indication is used together with an index of the second PDCCH occasion among the second plurality of PDCCH occasions for determining the bit sub-block in the bit block.

11. The base station according to claim 8, wherein the first time interval length is expressed in a number of slots corresponding to a target subcarrier spacing, and the first time interval length is used to determine a length of a time interval in time domain between a slot to which the first PDCCH occasion belongs and a slot to which the first signal belongs; or, the first time interval length is expressed in a number of symbols corresponding to the target subcarrier spacing, and the first time interval length is used to determine a length of a time interval in time domain between a starting symbol in the first PDCCH occasion and a starting symbol occupied by the first signal; the target subcarrier spacing is equal to one of a subcarrier spacing used by the first signaling or a subcarrier spacing used by the first signal.

12. The base station according to claim 8, wherein a PDCCH candidate occupied by the first signaling is a first PDCCH candidate, and a second PDCCH candidate is a PDCCH candidate other than the first PDCCH candidate; a quasi co-location of a reference signal comprised in the first PDCCH candidate is different from a quasi co-location of a reference signal comprised in the second PDCCH candidate; and wherein the first PDCCH candidate and the second PDCCH candidate are linked.

13. The base station according to claim 8, wherein the second receiver receives a second information block; wherein the second information block is used to indicate at least one of whether a transmitter transmitting the second information block supports PDCCH candidates being mutually linked or a linkage type between mutually linked PDCCH candidates supported by the transmitter transmitting the second information block.

14. A method in a user equipment (UE) for wireless communications, comprising: receiving a first information block, the first information block being used to determine a first plurality of PDCCH occasions;
   receiving a first signaling and receiving a first signal, the first signal occupying a frequency-domain resource set in frequency domain, and the first signaling being used to determine the frequency-domain resource set; and
   transmitting a second signal, the second signal carrying a bit block, the bit block comprising at least one bit;
   wherein the first signaling is used to determine a first time interval length, the first time interval length being used to determine a length of a time interval in time domain between a first PDCCH occasion and the first signal, the first PDCCH occasion being a PDCCH occasion having a latest end time among the first plurality of PDCCH occasions; the bit block comprises a bit sub-block, the bit sub-block comprising at least one bit; a position of the first signal in time domain is used to determine a position of the second signal in time domain, whether the first signal is correctly received being used to determine a bit value of the bit sub-block; a second PDCCH occasion is used to determine the bit sub-block in the bit block, wherein the second PDCCH occasion is a PDCCH occasion having an earliest start time among the first plurality of PDCCH occasions.

15. The method in the UE according to claim 14, wherein the first signaling is used to determine a target symbol interval, the target symbol interval being used to determine a starting symbol occupied by the first signal in time domain, and a number of symbols in the target symbol interval being used to determine the first time interval length; whether the first PDCCH occasion and the first signal belong to a same slot is used to determine whether a starting symbol in the first PDCCH occasion is used to determine the bit sub-block in the bit block, wherein the number of symbols in the target symbol interval is used to determine the bit sub-block in the bit block.

16. The method in the UE according to claim 14, comprising:
receiving a second signaling;
wherein a PDCCH candidate occupied by the second signaling is different from a PDCCH candidate occupied by the first signaling; the second signaling carries a target indication, the second signaling belonging to the second PDCCH occasion in time domain; the second PDCCH occasion belongs to a second plurality of PDCCH occasions; the second plurality of PDCCH occasions are indexed in order, and the target indication is used together with an index of the second PDCCH occasion among the second plurality of PDCCH occasions for determining the bit sub-block in the bit block.

17. The method in the UE according to claim 14, wherein the first time interval length is expressed in a number of slots corresponding to a target subcarrier spacing, and the first time interval length is used to determine a length of a time interval in time domain between a slot to which the first PDCCH occasion belongs and a slot to which the first signal belongs; or, the first time interval length is expressed in a number of symbols corresponding to the target subcarrier spacing, and the first time interval length is used to determine a length of a time interval in time domain between a starting symbol in the first PDCCH occasion and a starting symbol occupied by the first signal; the target subcarrier spacing is equal to one of a subcarrier spacing used by the first signaling or a subcarrier spacing used by the first signal.

18. The method in the UE according to claim 14, wherein a PDCCH candidate occupied by the first signaling is a first PDCCH candidate, and a second PDCCH candidate is a PDCCH candidate other than the first PDCCH candidate; a quasi co-location of a reference signal comprised in the first PDCCH candidate is different from a quasi co-location of a reference signal comprised in the second PDCCH candidate; and wherein the first PDCCH candidate and the second PDCCH candidate are linked.

19. The method in the UE according to claim 14, wherein the first signal occupies a first time-domain resource block in time domain, while a signaling carried by a PDCCH candidate other than a PDCCH candidate occupied by the first signaling is used to indicate a second time-domain resource block, wherein overlapping time-domain resources exist between the first time-domain resource block and the second time-domain resource block.

20. The method in the UE according to claim 14, comprising:
transmitting a second information block;
wherein the second information block is used to indicate at least one of whether the UE supports PDCCH candidates being mutually linked or a linkage type between mutually linked PDCCH candidates supported by the UE.

* * * * *